US008909829B1

(12) United States Patent
Thangapalam et al.

(10) Patent No.: US 8,909,829 B1
(45) Date of Patent: Dec. 9, 2014

(54) METHODS AND APPARATUS FOR STORAGE POOL SELECTION

(71) Applicant: EMC Corporation, Hopkinton, MA (US)

(72) Inventors: Stalinsaravanakumar Thangapalam, Bangalore (IN); Anoop George Ninan, Milford, MA (US); Katakam Gangadhar, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/037,663

(22) Filed: Sep. 26, 2013

(51) Int. Cl.
*G06F 3/00* (2006.01)
*G06F 13/12* (2006.01)
*G06F 13/38* (2006.01)
*G06F 3/06* (2006.01)

(52) U.S. Cl.
CPC ............ *G06F 3/0689* (2013.01); *G06F 3/0604* (2013.01); *G06F 3/0655* (2013.01)
USPC .............................................. 710/62; 710/18

(58) Field of Classification Search
None
See application file for complete search history.

(56) References Cited

U.S. PATENT DOCUMENTS

| | | | |
|---|---|---|---|
| 7,203,730 B1 | 4/2007 | Meyer et al. | |
| 7,512,754 B1* | 3/2009 | Chaitanya et al. | 711/158 |
| 7,685,261 B1 | 3/2010 | Marinelli et al. | |
| 2012/0151355 A1 | 6/2012 | Butt et al. | |
| 2012/0166748 A1* | 6/2012 | Satoyama et al. | 711/165 |
| 2013/0159359 A1* | 6/2013 | Kumar et al. | 707/822 |

OTHER PUBLICATIONS

U.S. Appl. No. 13/536,357 Office Action dated Sep. 18, 2014, 22 pages.
U.S. Appl. No. 13/536,357, filed Jun. 28, 2012, Anurag Jain, et al.
U.S. Appl. No. 13/730,037, filed Dec. 28, 2012, Mallari Mohanrao Kulkarni, et al.
Office Action in U.S. Appl. No. 13/536,357 dated Feb. 25, 2014, 24 pages.
"Prosphere Discovery and Monitoring for the Modern Data Center", White Paper, Aug. 2011, $EMC^2$, 17 pages.
"Prosphere: Next Generation Storage Resource Management", White Paper, Aug. 2011, $EMC^2$, 13 pages.
Vblock Infrastructure Platforms Series 300 Architecture Overview, Version 2.4, Aug. 2011, The Virtual Computing Environment Company, www.vce.com, 74 pages.
Cisco Unified Computing System and EMC VNXe3300 Unified Storage System, White Paper, Jan. 2011, Revision 1.0, $EMC^2$, Cisco Systems, Inc., 170 West Tasman Drive, San Jose, CA 95134-1706, www.cisco.com, 9 pages.
EMC Integrated Infrastructure for VMware Enabled by EMC VNXe3100 and VMware vSphere 4.1, An Architectural Overview, White Paper, EMC Global Solutions, $EMC^2$, Feb. 2011, 24 pages.

(Continued)

*Primary Examiner* — Kris Rhu
(74) *Attorney, Agent, or Firm* — Daly, Crowley, Mofford & Durkee, LLP

(57) ABSTRACT

Methods and apparatus to create a volume using an automated storage tier policy and a virtual storage tier from storage pools having a plurality of disk types. In one embodiment, a utilization percentage for the storage virtual tiers is used.

17 Claims, 24 Drawing Sheets

(56) References Cited

OTHER PUBLICATIONS

VMware vStorage APIs for Array Integration with EMC VNX Series for NAS, Benefits of EMC VNX for File Integration with VMware VAAI, White Paper, EMC Solutions Group, Jan. 2012, $EMC^2$, 17 pages.

Vblock™ Infrastructure Platforms 2010 Vblock Platforms Architecture Overview, Version 1.3, Nov. 2011, The Virtual Computing Environment Company, www.vce.com, 25 pages.

Best Practices for Deploying VMware vCloud Director on Vblock Infrastructure Platforms, Sep. 2011, The Virtual Computing Environment Company, www.vce.com, 20 pages.

Service Catalog Strategies for Vblock™ Infrastructure Platforms, IaaS COE, Jan. 2011, The Virtual Computing Environment Company, www.vce.com, 19 pages.

Unified Infrastructure Manager/Provisioning, © 2011 VCE Company, The Virtual Computing Environment Company, www.vce.com, 3 pages.

Vblock™ Infrastructure Platforms Technical Overview, © 2011 VCE Company, The Virtual Computing Environment Company, www.vce.com, 8 pages.

Vblock™ Solution for Trusted Multi-Tenancy: Technical Overview, Aug. 2011, The Virtual Computing Environment Company, www.vce.com, 75 pages.

U.S. Appl. No. 13/536,357 Response filed Jul. 10, 2014 13 pages.

\* cited by examiner

METHODS AND APPARATUS FOR STORAGE POOL SELECTION

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

To leverage value, MSS are typically networked in some fashion, Popular implementations of networks for MSS include network attached storage (NAS) and storage area networks (SAN). In NAS, MSS is typically accessed over known TCP/IP lines such as Ethernet using industry standard file sharing protocols like NFS, HTTP, and Windows Networking. In SAN, the MSS is typically directly accessed over Fibre Channel switching fabric using encapsulated SCSI protocols.

Each network type has its advantages and disadvantages, but SAN's are particularly noted for providing the advantage of being reliable, maintainable, and being a scalable infrastructure but their complexity and disparate nature makes them difficult to centrally manage. Thus, a problem encountered in the implementation of SAN's is that the dispersion of resources tends to create an unwieldy and complicated data storage environment. Reducing the complexity by allowing unified management of the environment instead of treating as a disparate entity would be advancement in the data storage computer-related arts. While it is an advantage to distribute intelligence over various networks, it should be balanced against the need for unified and centralized management that can grow or scale proportionally with the growth of what is being managed. This is becoming increasingly important as the amount of information being handled and stored grows geometrically over short time periods and such environments add new applications, servers, and networks also at a rapid pace.

SUMMARY

Exemplary embodiments of the invention provide methods and apparatus for receiving a user initiation of volume creation and user selection for an automated storage tier policy from a plurality of automated storage tier policies and selection of a virtual storage tier from a plurality of virtual storage tiers, wherein each virtual tier in the plurality of virtual tiers has an associated disk type in the plurality of disk types, wherein an array includes the associated disk types in the plurality of disk types, identifying storage pools meeting the user selections from a plurality of storage pools having selected ones of the virtual tiers, determining a utilization percentage for the virtual tiers in the identified storage pools, selecting one of the identified storage pools based upon the utilization percentages, and creating a volume on an array using the selected storage pool.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
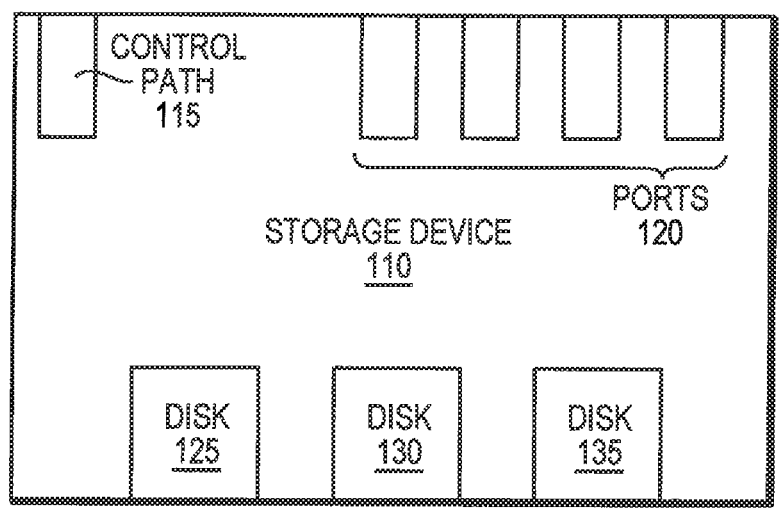
FIG. 1 is a simplified illustration of a data storage device, in accordance with an embodiment of the present disclosure.

Typically, control of and provisioning of multiple data services for heterogeneous storage systems may be problematic. Conventionally, some systems may have only enabled provisioning of homogenous storage systems. Generally, controlling provisioning of heterogeneous storage with a single control path may not have been possible. Conventionally, providing different types of data services through a single control path may not have been possible.

In certain embodiments, the current disclosure may enable a distributed software control platform that allows enterprise IT departments and cloud service providers to convert the heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multitenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as one large storage array. In further embodiments, the current disclosure may enable one big array to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through the Bourne software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMware® and OpenStack™.

In certain embodiments, the following definitions may be useful:

A data service may be a service for receiving, processing, storing, and protecting data. In certain embodiments, data services provide the high-level data and storage management capabilities of the system.

A control path may be a way to establish and control access to the data.

A data path may be the path the data takes.

A storage medium may be any medium that is capable of storing data, including, but not limited to a storage array, a storage cluster, a physical disk, a virtual disk, and a virtual storage system.

A tenant may represent an organization operating within a one big array. In some embodiments, a tenant may be created in the system for the purposes of security isolation.

A project may be a resource organization abstraction that maps resources to applications, virtual data centers, departments, or other entities meaningful to the user. In some embodiments, a user may create their own projects, and may associate multiple resources from different services with them. In most embodiments, resources from one project maybe shared between users under the same tenant.

Generally, a data storage array or system may be one or more physical boxes or a cluster of physical boxes. In conventional systems, the data storage array or system may have one control path and some number of data paths. In typical systems, one or more data path ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system.

Conventionally, the data storage system or array may be a cluster of storage mediums. Typically, providing management for large numbers of data storage arrays or systems may be challenging.

Refer, now to the example embodiment of FIG. 1 which illustrates a sample storage device. Storage device 110 has control path 1115, ports 120, and disks 125, 130, and 135. Control path 115 enables a user to interface with storage device 110. Control path 115 enables a user to access disks 125, 130, and 135, via the services storage device 110 offers, through one or more of ports 120.

In an embodiment, the current disclosure may enable provisioning of data services across heterogeneous storage systems with a single control path. In a further embodiment of the present disclosure, a one big array may be enabled that provides a single control path and multiple data paths for heterogeneous data storage arrays or data storage systems. In some embodiments, the one big array may enable multiple types of storage systems such as VMAX, VNE, Isilon, Greenplum, and those from NetApp to be integrated together. In an embodiment, the one big array may be infinitely scalable to include any number of storage systems. In most embodiments, interaction with the data services may be through an API.

In certain embodiments, the one big array may offer different types of data services. In further embodiments, a one big array may be enabled to allow new data services to be added.

In certain embodiments, the one big array may enable the array to provide multiple types of data services through a single control path. In some embodiments, the one big array and the data services offered by the one big array may be extensible. In most embodiments, the one big array may offer file, block and object data services. In certain embodiments, the one big array may enable new data services to be created. In most embodiments, object data services may be implemented through the use of a key and an object pairing. In alternative embodiments, the one big array may enable the user to define further types of data services. In a further embodiment, the one big array may implement a database data service. In another further embodiment, the one big array may enable a message queuing data service.

In at least one embodiment, a user may interact with the one big array through an API. In some embodiments, the one big array may enable a set of data services, with different quality of services. In at least some embodiments, the data services may be provided through an API. In most embodiments, the API may abstract the set of storage systems available to the one big array away from the user. In at least some embodiments, the one big array may enable data services, such as storage provisioning through the one big array.

In most embodiments, the one big array may have a BIOS or set of drivers to enable it to interact with multiple types of storage systems. In certain embodiments, the BIOS may interact with a set of heterogeneous arrays. In further embodiments, the BIOS may have a set of drivers enabling it provide data services on different types of heterogeneous arrays. In most embodiments, the BIOS may know how to control and understand what the underlying devices are capable of doing. In further embodiments, the BIOS may be able to determine the performance information of the underlying devices such as how much storage and what ports the device has. In other embodiments, the BIOS may be able to determine or query the performance information of the underlying devices. In some embodiments, the BIOS may be software or use software to communicate with the underlying devices. In other embodiments, the BIOS may communicate with the devices using one or more protocols such as TCP/IP. In still further embodiments, the BIOS may be run through a set of Virtual Machines.

In some embodiments, the one big array may enable different grades of storage services. In a first embodiment, the one big array may offer different quality of services. In a second embodiment, different users may be offered different quality of services. In a third embodiment, different tenants may be offered different quality of services. In a fourth embodiment, different users with a particular tenant may be offered different quality of services. In certain embodiments, the quality of service may include some combination of the speed of the storage, the data services available, the reliability of the storage, the amount of service available. In further embodiments, the quality of services provided to a particular user may include platinum, gold, silver, and bronze types of quality of service.

In most embodiments, requests to the one big array may be handles through an API. In some embodiments, an API may publish a set of possible interfaces with the one big array. In certain embodiments, the interfaces may enable the provisioning of data services to the underlying storage systems available to the one big array. In further embodiments, the one big array may have an API server. In most embodiments, the API server may receive API requests sent to the big array and determine whether to process the requests. In an embodiment, the API server may have an authorization module to authenticate a particular user or tenant. In other embodiments, the API server may determine another module to handle the API request.

In a particular embodiment, the one big array may have a metadata store. In certain embodiments, there may be a metadata service. In most embodiments the metadata store or the metadata service may store the state and information for a one big array. In most embodiments, the meta data store or metadata service may include information about the tenants using the one big array. In certain embodiments, the metadata services or metadata store may contain a notion of the class of service available in the one big array.

In some embodiments, there may be a data service module which may offer block, file, and object storage. In certain embodiments, the data services module may publish the data service available. In at least one embodiment, there may be a module for managing tenants that may access a one big array. In some embodiments, the modules for managing the tenants may enable chargeback to a tenant based on the tenants use of the one big array. In most embodiments, there may be modules for managing security. In further embodiments, there may be a module for metering and monitoring the data use and throughput of a one big array. In further embodiments, there may be a module for monitoring bandwidth. In particular embodiments, each of the modules may be able to publish the information about the services the module offers. In most embodiments, the published information may be available in the API via the API server.

In certain embodiments, there may a provisioning engine. In most embodiments, a provisioning engine may implement storage requests. In some embodiments, the provisioning engine may send a request to a placement engine. In particular embodiments, the placement engine may determine what placements of storage are possible based on the request and the underlying storage available to the one big array. In most embodiments, the placement engine may return one or more possible placements to the provisioning engine. In at least one embodiment, the placement and scheduling engine may determine a set if arrays for the request, including which pools may to be used, and which ports may be used to access the data. In further embodiments, the placement engine may attempt to implement the possible placements received from the placement engine. In further embodiments, the placement and scheduling engine may have policy logic.

Figure 2:
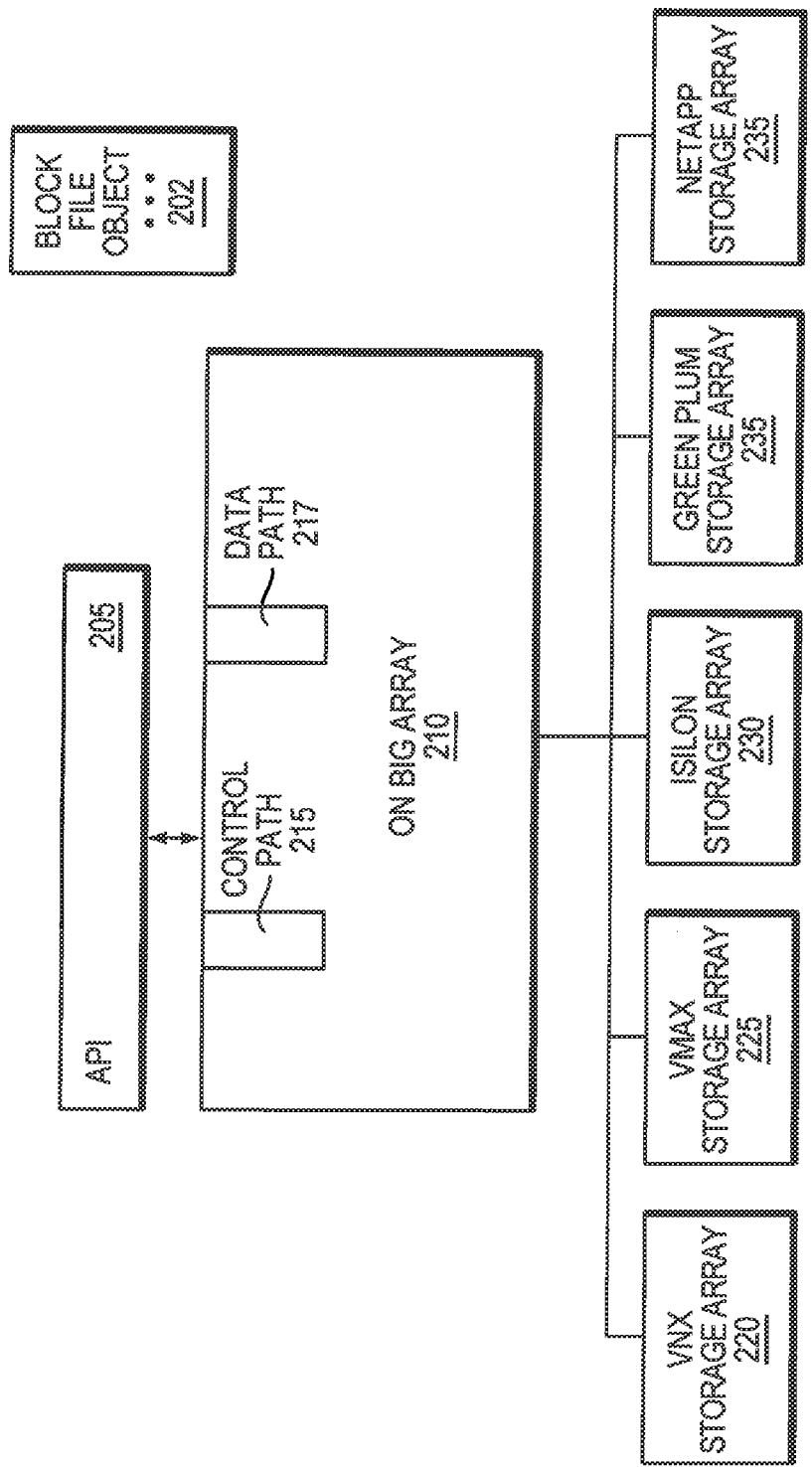
FIG. 2 is a simplified illustration of a one big array with a single control path, in accordance with an embodiment of the present disclosure.

Refer now to the example embodiment of FIG. 2. The example embodiment of FIG. 2 illustrates a sample embodiment of a one big array. API 205 is exposed to a user or machine. API 205 may be used to communicate requests to One Big Array 210. One Big Array 205 has control path 215 and data path 217. One Big Array 210 provides block, file, and object data services 202. One Big Array 210 consumes and offers storage provided by VNX 220, VMAX 225, Isilon 230, GreenPlum 235, and NetApp 235. One Big Array 210 enables, through API 205, this storage to be provisioned to users.

Figure 3:
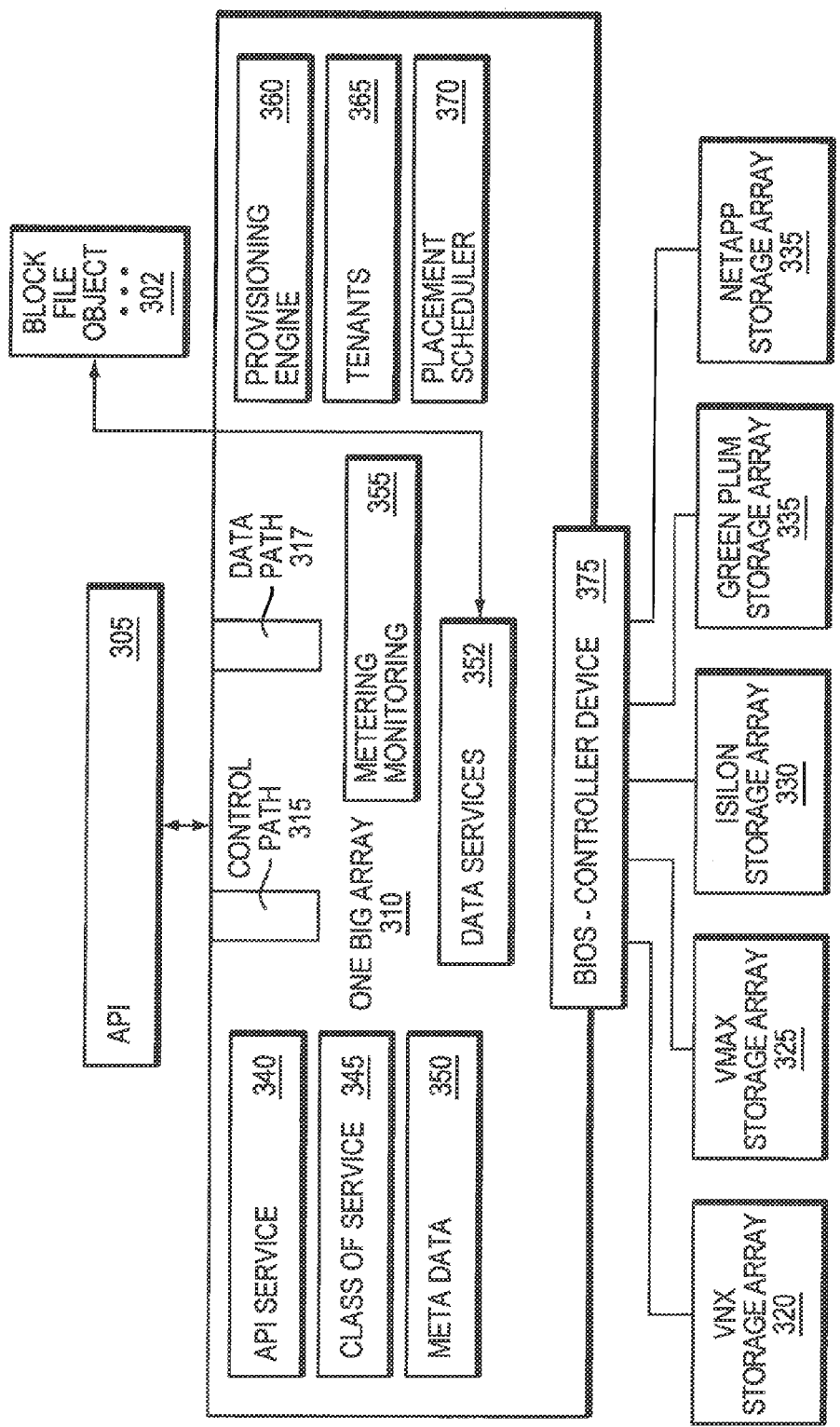
FIG. 3 is an alternative simplified illustration of a one big array with a single control path, in accordance with an embodiment of the present disclosure.

Refer now to the example embodiment of FIG. 3. FIG. 3 illustrates another example embodiment of a one big array and several modules. One Big Array 310 has API service 350, class of service 345, metadata 350, metering monitoring module 355, provisioning engine 360, tenants module 365, and placement schedule 370. One Big Array 310 also has BIOS 375. API service 340 services requests from API 305. Class of Service Module 345 enforces class of service provisioning from requests sent by API service 340. Metadata module 350 keeps information about the system such as the types of storage available, how much storage is used, and what are the performance metrics of each type of storage are. Data services module 352 may offer data services, such as Block, File, and object as well as enabling other data services to be defined. Metering Monitoring module 355 keeps track of the amount of data used and the throughput of the data, both on an aggregate basis and for any tenants using the system. Tenants module 355 enforces policy about what tenants may access what data within One Big Array 375. Provisioning engine 360 receives requests from API service 340 and makes requests to placement scheduler 370. Placement schedule 370 takes a request for storage from provisioning engine 360 and, based on the available storage, outlines a set of storage and ports that may be able to satisfy the request. BIOS 375 has a set of device drivers and is able to poll and control the attached storage arrays 320-335.

Figure 4:
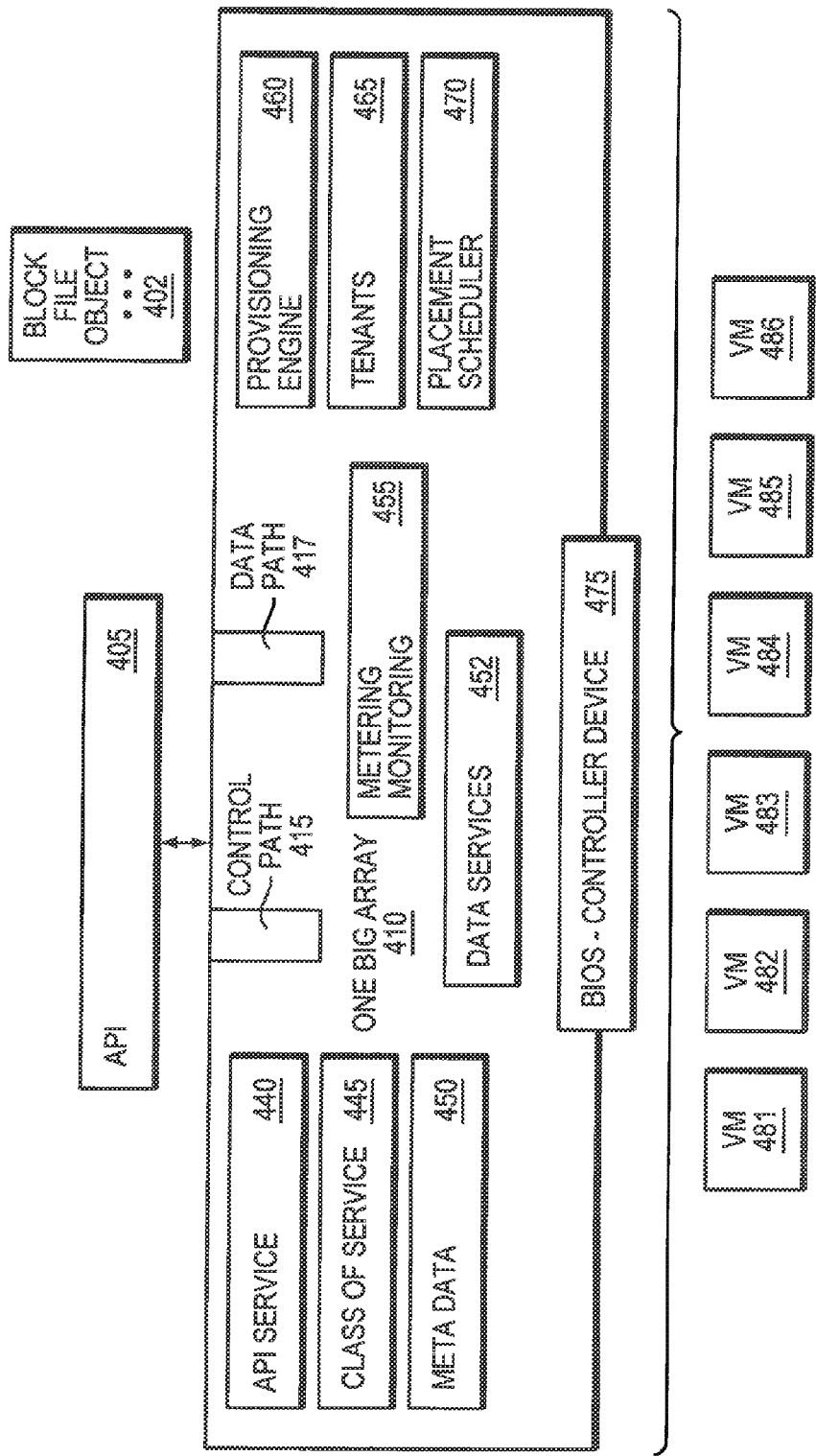
FIG. 4 is a further alternative simplified illustration of a one big array with a single control path in accordance with an embodiment of the present disclosure.

Refer now to the example embodiment of FIG. 4. In the example embodiment of FIG. 4, BIOS 475 is implemented by a set of virtual machines 481-486. The virtual machines interact with storage based on commands from BIOS 475. BIOS 475 may receive commands from other modules.

Figure 5:
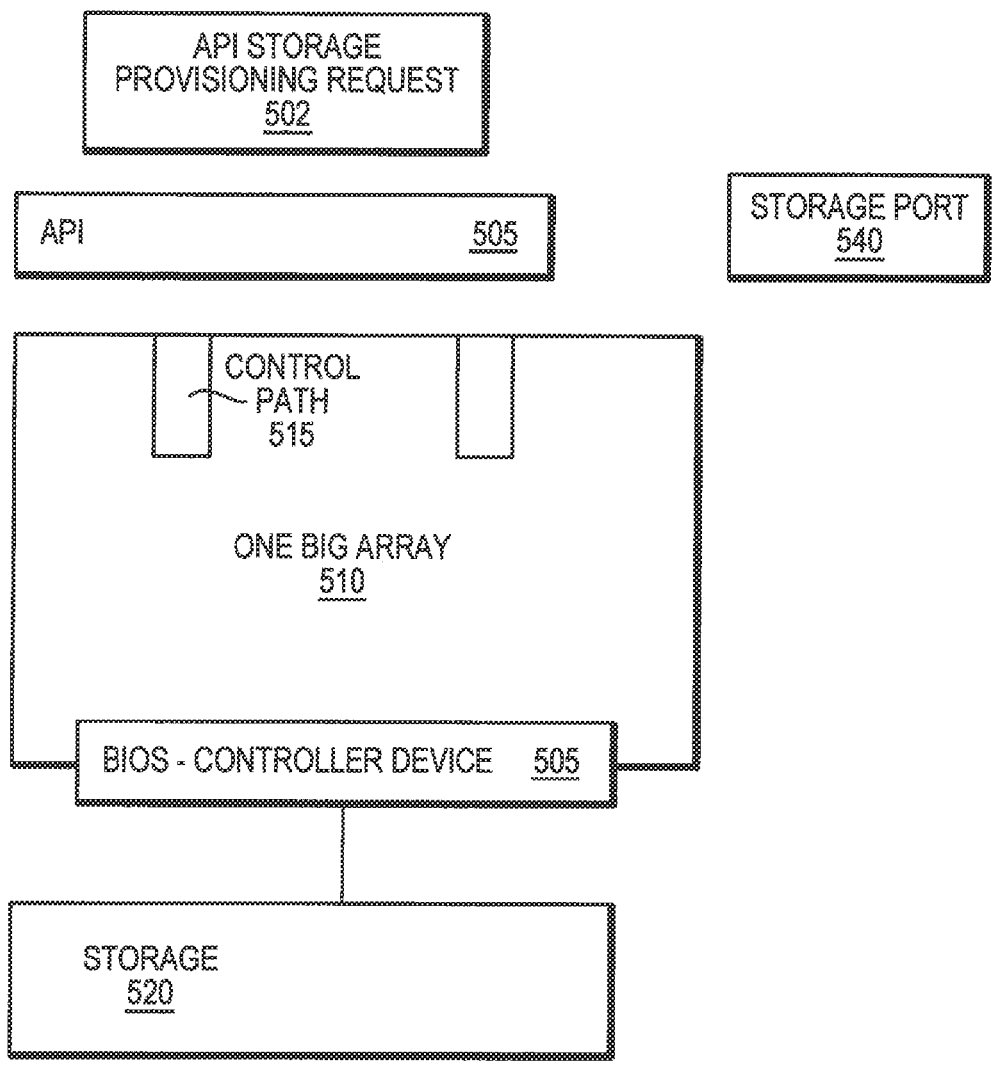
FIG. 5 is a simplified illustration of a one big array and an API Storage Provisioning request, in accordance with an embodiment of the present disclosure.
Figures 6, 7:
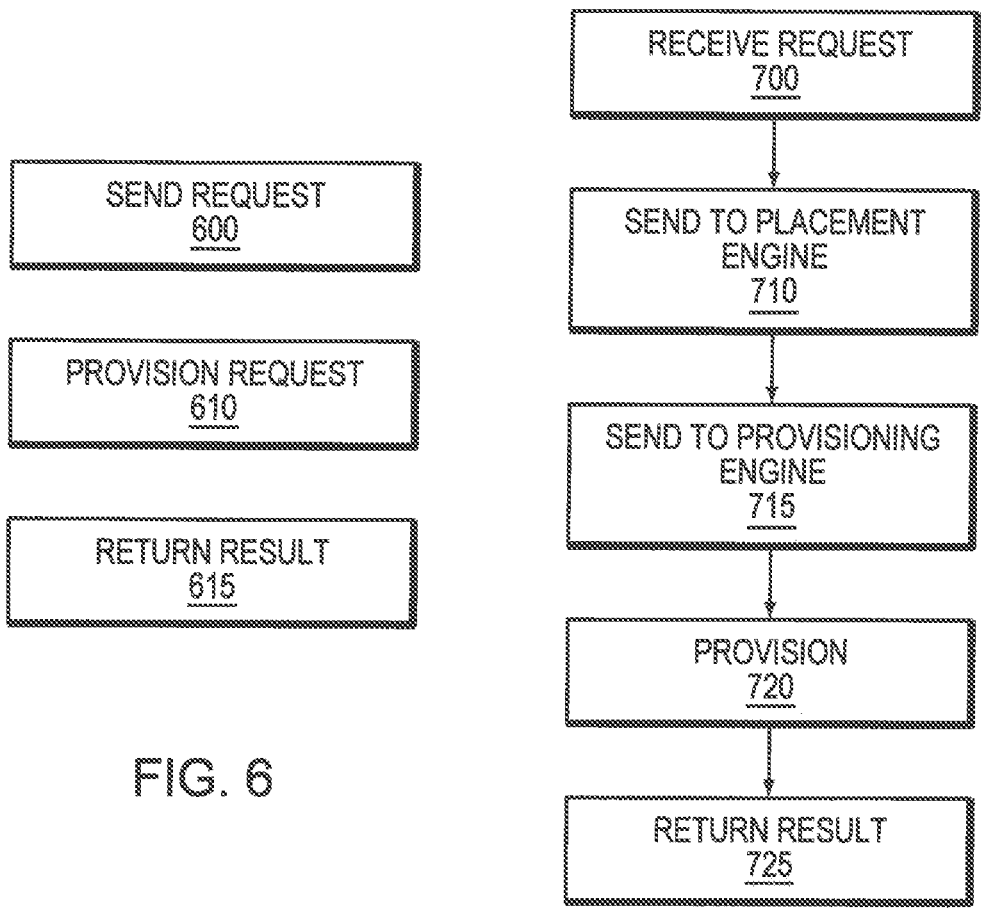
FIG. 6 is an example embodiment of a method for provisioning storage on a one big array, in accordance with an embodiment of the present disclosure.
FIG. 7 is an alternative embodiment example of a method for provisioning storage on a one big array, in accordance with an embodiment of the present disclosure.

Refer now to the example embodiments of FIGS. 5 and 6. The example embodiments of FIGS. 5 and 6 illustrate a simplified storage provisioning request. API 505 sends storage provisioning request 502 to One Big Array 510 (step 600). One Big Array 510 provisions storage from storage 520 for request 502 (step 610). The provisioned storage is returned in the form of storage and port 540. (step 615).

Refer now to the example embodiments of FIGS. 3 and 7. The example embodiments illustrate a simplified flow of how One Big Array 710 provisions storage for a storage request. API server 340 receives the request (700). API server 340 sends the storage request to placement engine 370 (step 710). Provisioning engine 360 sends the request to placement engine 370 (step 715). Placement engine 370 returns what storage of the One Big Array 310 may be used for the request and provisioning engine 360 provisions the storage for the request (720). The results of the storage request are returned (step 725). In the simplified example embodiment of FIGS. 3 and 7, other modules may interact with the request such as tenant module 365 enforcing access restrictions based on which tenant is making the request.

Figure 8:
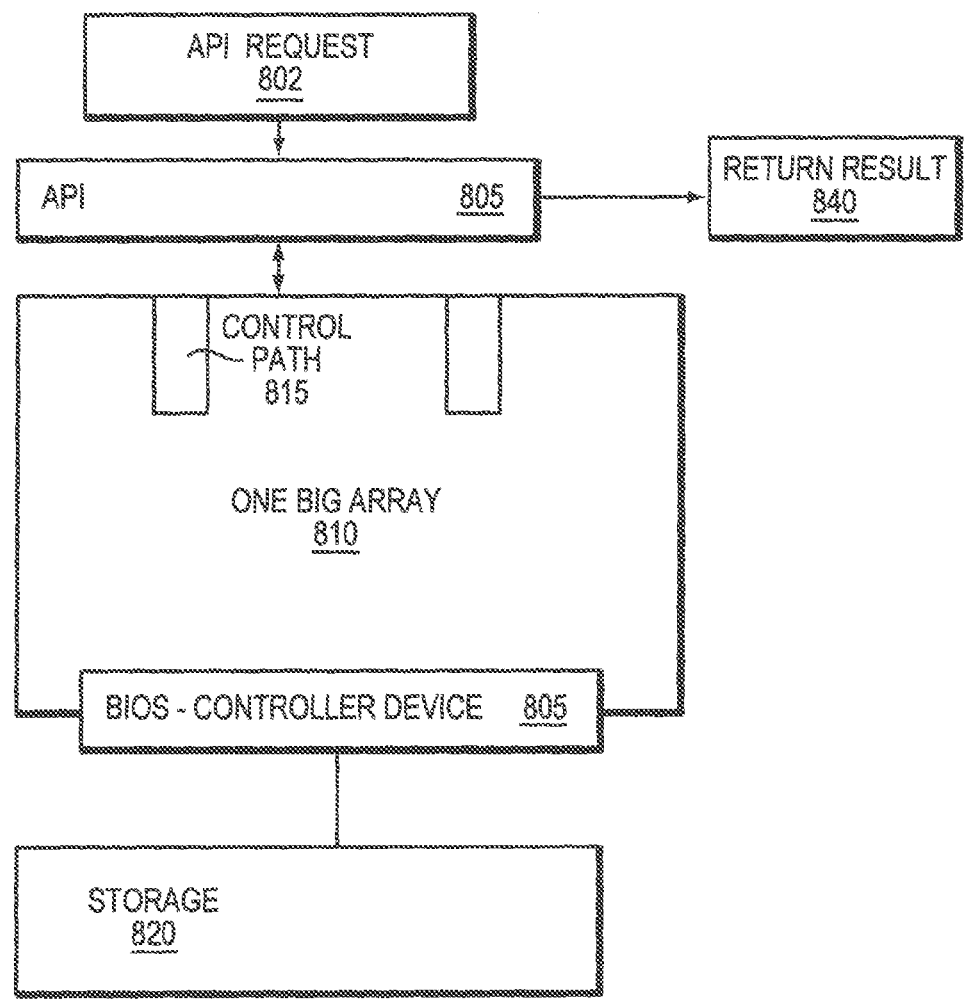
FIG. 8 is a simplified illustration of a one big array and an API request, in accordance with an embodiment of the present disclosure.
Figure 9:
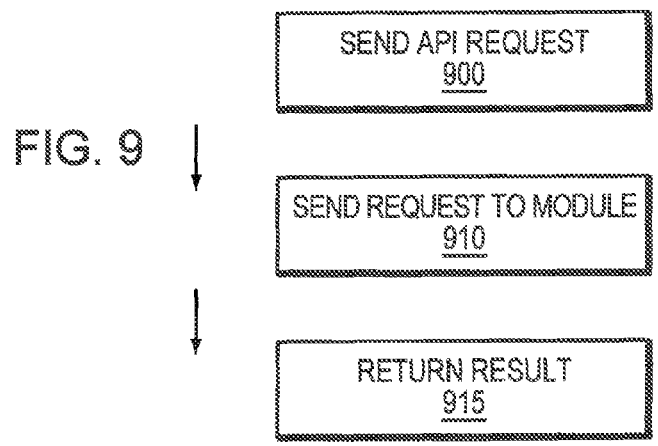
FIG. 9 is an example embodiment of a method for responding to an API request on a one big array, in accordance with an embodiment of the present disclosure.

Refer now to the example embodiments of FIGS. 8 and 9. The example embodiments of FIGS. 8 and 9 illustrate a simplified way of how an API request may be handles. API request 802 is sent to One Big Array 810 (step 900). One Big Array 810 sends the request to the module that handles the request (step 910). Result 840 of API request 802 is returned (step 915).

Figure 10:
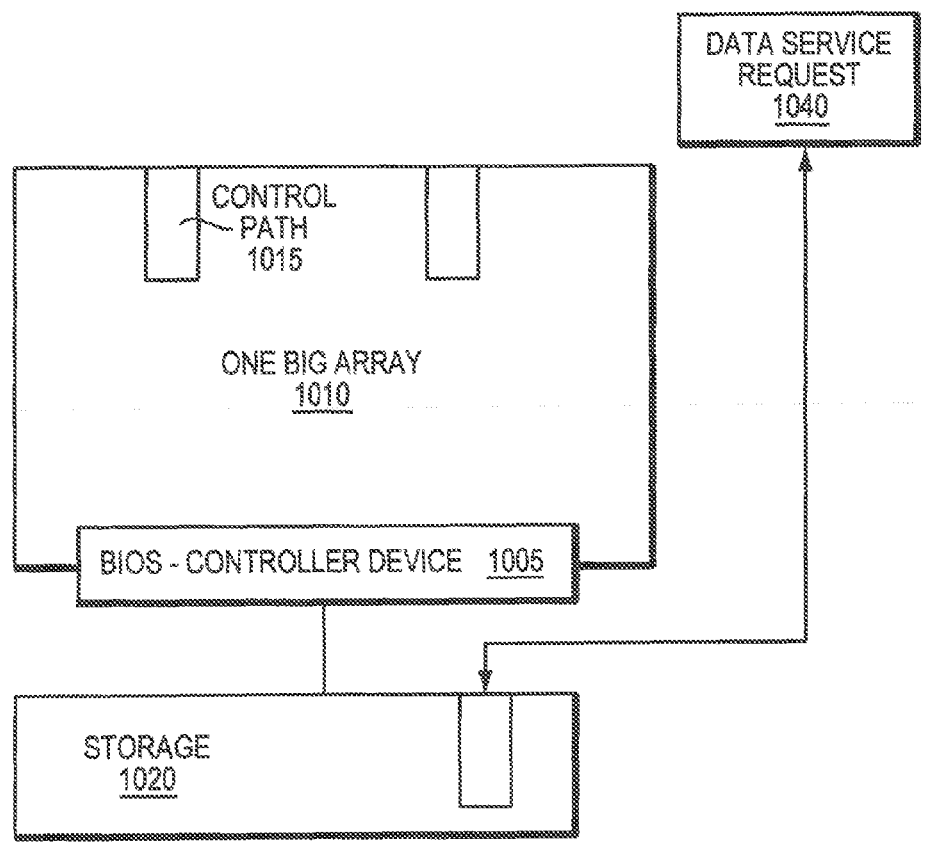
FIG. 10 is a simplified illustration of a one big array and a data services request for block storage, in accordance with an embodiment of the present disclosure.
Figure 11:
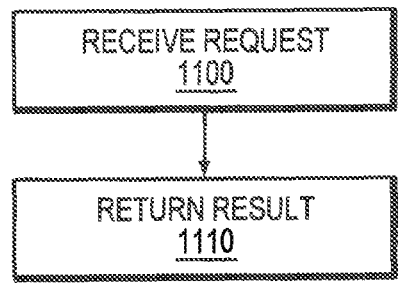
FIG. 11 is an example embodiment of a method for responding to a data services request on a one big array, in accordance with an embodiment of the present disclosure.

Refer now to the example embodiments of FIGS. 10 and 11. FIGS. 10 and 11 illustrate how a data service request such as block or file may be may be handled. Request 1040 is received at storage 1020 (step 1100). Result 1040 is returned from storage 1020 (step 1100).

Figure 12:
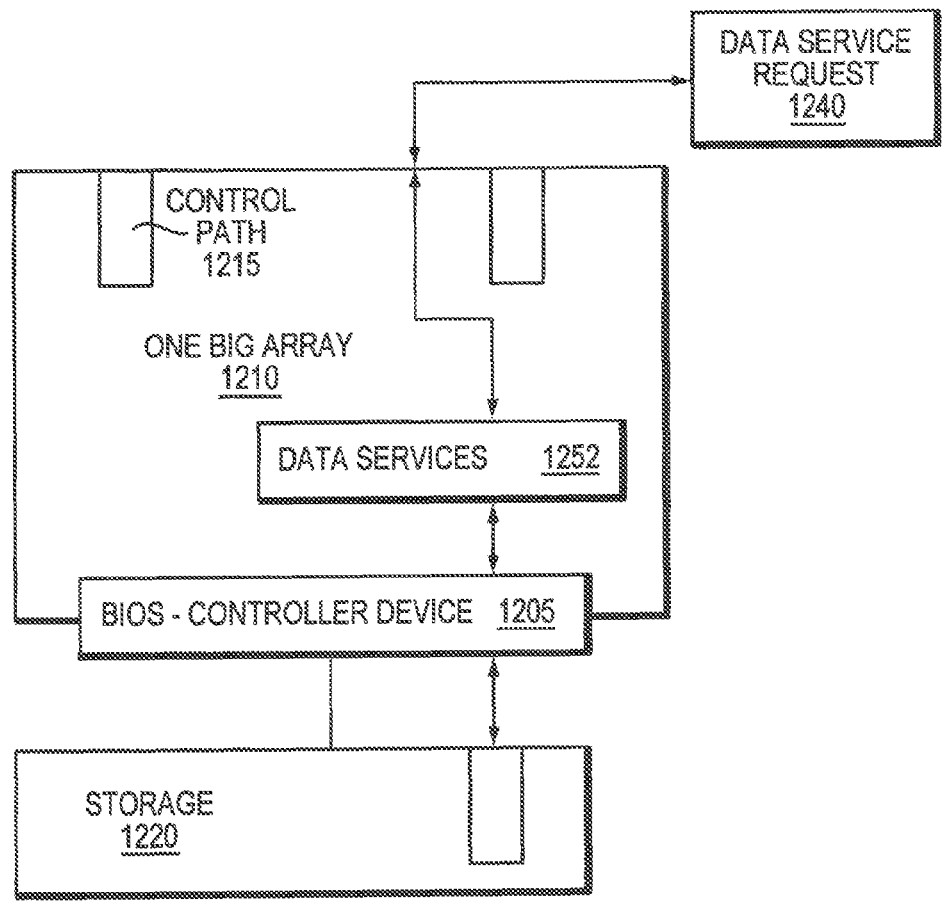
FIG. 12 is a simplified illustration of a one big array and a object data services request for block storage, in accordance with an embodiment of the present disclosure.
Figure 13:
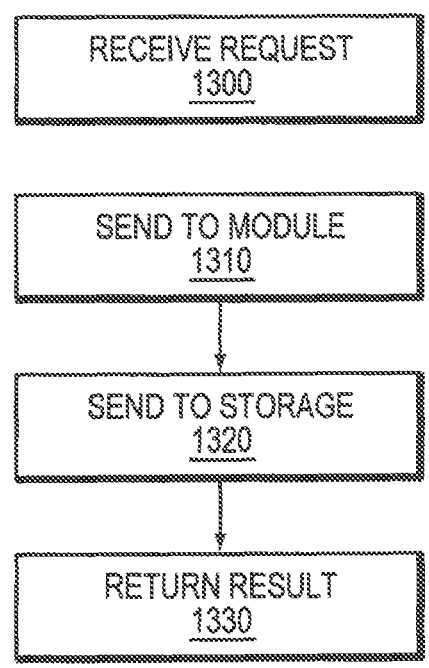
FIG. 13 is an example embodiment of a method for responding to an object data services request on a one big array, in accordance with an embodiment of the present disclosure.
Figure 14:
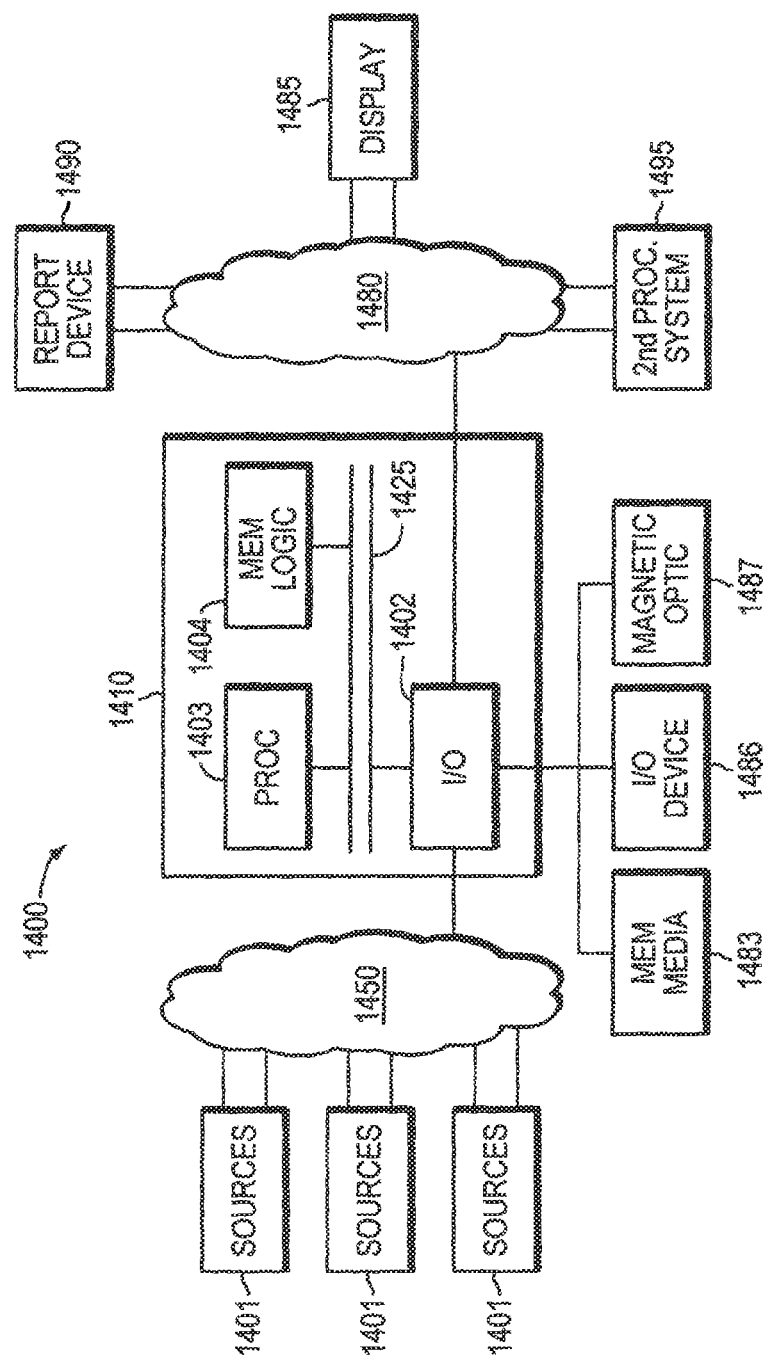
FIG. 14 is an example of an embodiment of an apparatus that may utilize the techniques described herein, in accordance with an embodiment of the present disclosure.

Refer now to the example embodiments of FIGS. 12 and 13. FIGS. 12 and 11 illustrate how a data services request such as object data may be handled. Request 1240 is received at one big array 1210 (step 1300). Request 1240 is sent to the Data services 1252 in one big array 1210 (step 1310). Request 1240 is sent to storage 1220 (step 1320). Result 1240 is returned from storage 1220 (step 1330).

Cloud environments can provide fully automated storage tiering (FAST) support for managed service storage. In general, while having some high level similarities, different storage array types provide varying mechanisms and models to support FAST.

It is known that conventional datacenters are typically populated with systems of many types, from various vendors, which often have different methods and processes to achieve the same functionality. For example, most storage systems implement a method of expanding a storage volume, but each vendor has their own differently branded-name for the feature, with procedures that are different enough so as to require datacenter technicians to know the different procedures for each one. And sometimes a vendor will have more than one model of storage system, each with varying implementations of the same feature, so that using a single vendor does not overcome this issue.

Currently available storage array often have what is referred to as "automated storage tiering." The way in which this feature is implemented on different arrays varies, while producing similar results. The internal model used to represent the array entities varies, as do the commands used to configure the feature. So, one array may have tiering 'policies' that contain 'tiers' each of which includes a collection of multiple storage pools, while another may have multiple tiers within a single pool. Such fundamental differences in the way the array represents and implements this feature end up requiring larger IT staff, more training, and more chances to confuse arrays and mis-configure a system.

Fully Automated Storage Tiering (FAST), which can be provided for virtual pools (VP), for example, increases performance by intelligently managing data placement at a sub-LUN level. When FAST is implemented, the storage system measures, analyzes, and implements a dynamic storage-tiering policy much faster and more efficiently than an administrator could ever achieve.

Storage tiering puts drives of varying performance levels and cost into a storage pool. LUNs use the storage capacity they need from the pool, on the devices with the required performance characteristics. The relative activity level of each slice is used to determine which slices should be promoted to higher tiers of storage. Relocation is initiated at the user's discretion through either manual initiation or an automated scheduler.

As data progresses through its life cycle, it experiences varying levels of activity. When data is created, it is typically heavily used. As it ages, it is accessed less often. This is often referred to as being temporal in nature.

In an exemplary embodiment, a FAST system segregates disk drives into the following tiers:
- extreme performance tier—e.g., flash drives;
- performance tier—e.g., serial attach SCSI (SAS) drives and Fibre Channel (FC) drives; and
- capacity Tier—e.g., Near-Line SAS (NL-SAS) drives and SATA drives Flash drives are built on solid-state drive (SSD) technology with no moving parts. The absence of moving parts makes these drives highly energy-efficient, and eliminates rotational latencies. Therefore, migrating data from spinning disks to Flash drives can boost performance and create significant energy savings. Adding a small (e.g., single-digit) percentage of Flash capacity to storage, while using intelligent tiering can deliver double-digit percentage gains in throughput and response time performance in some applications.

Traditional spinning drives offer high levels of performance, reliability, and capacity. These drives are based on mechanical hard-drive technology that stores digital data on a series of rapidly rotating magnetic platters, e.g., 10 k and 15 k rpm spinning drives.

Using capacity drives can significantly reduce energy use and free up more expensive, higher-performance capacity in higher storage tiers. In some environments, 60 percent to 80 percent of the capacity of many applications has little I/O activity. Capacity drives can cost about four times less than performance drives on a per-gigabyte basis, and a small fraction of the cost of Flash drives. They consume up to 96 percent less power per TB than performance drives. Capacity drives have a slower rotational speed than Performance Tier drives, e.g., 7.2 k rotational speed.

In general, FAST systems operate by periodically relocating the most active data up to the highest available tier to ensure sufficient space in the higher tiers FAST relocates less active data to lower tiers. In an exemplary embodiment, each 1 GB block of data is referred to as a "slice." When FAST relocates data, it will move the entire slice to a different storage tier.

Heterogeneous storage pools are the framework that allows FAST to fully utilize each of the storage tiers discussed. Heterogeneous pools are made up of more than one type of drive. LUNs can then be created at the pool level. These pool LUNs are not bound to a single storage tier; instead, they can be spread across different storage tiers within the same pool.

FIG. 13 shows exemplary before and after data location by tier T1, T2, T3. As can be seen, before data relocation by tier, most active, neutral active and least active data are spread throughout the first T1, second T2, and third tiers T3. After data relocation, the most active data is relocated to storage in the highest performance tier T1.

In an exemplary embodiment, LUNs must reside in a pool to be eligible for FAST relocation. Pools support thick LUNs and thin LUNs. Thick LUNs are high-performing LUNs that use contiguous logical block addressing on the physical capacity assigned from the pool. Thin LUNs use a capacity-on-demand model for allocating drive capacity. Thin LUN capacity usage is tracked at a finer granularity than thick LUNs to maximize capacity optimizations. FAST is supported on both thick LUNs and thin LUNs.

In general, FAST systems uses a series of strategies to identify and move the correct slices to the desired tiers: statistics collection, analysis, and relocation.

In one aspect of statistics collection, a slice of data is considered hotter (more activity) or colder (less activity) than another slice of data based on the relative activity level of the two slices. Activity level is determined by counting the number of I/Os for each slice. FAST maintains a cumulative I/O count and "weights" each I/O by how recently it arrived. This weighting decays over time. New I/O is given full weight. After approximately 24 hours, for example, the same I/O carries about half-weight. After a week, the same I/O carries little weight. Statistics are continuously collected (as a background task) for all pool LUNs.

As part of the analysis process, once per hour, for example, the collected data is analyzed to produce a rank ordering of each slice within the pool. The ranking progresses from the hottest slices to the coldest slices relative to the other slices in the same pool. (For this reason, a hot slice in one pool may be comparable to a cold slice in another pool.) There is no system-level threshold for activity level. The most recent analysis before a relocation determines where slices are relocated.

During user-defined relocation windows, 1 GB slices are promoted according to both the rank ordering performed in the analysis stage and a tiering policy set by the user. During relocation, FAST relocates higher-priority slices to higher tiers; slices are relocated to lower tiers only if the space they occupy is required for a higher-priority slice. This way, FAST fully utilizes the highest-performing spindles first. Lower-tier spindles are utilized as capacity demand grows. Relocation can be initiated manually or by a user-configurable, automated scheduler.

The relocation process targets to create ten percent free capacity, for example, in the highest tiers in the pool. Free capacity in these tiers is used for new slice allocations of high priority LUNs between relocations.

Figure 15:
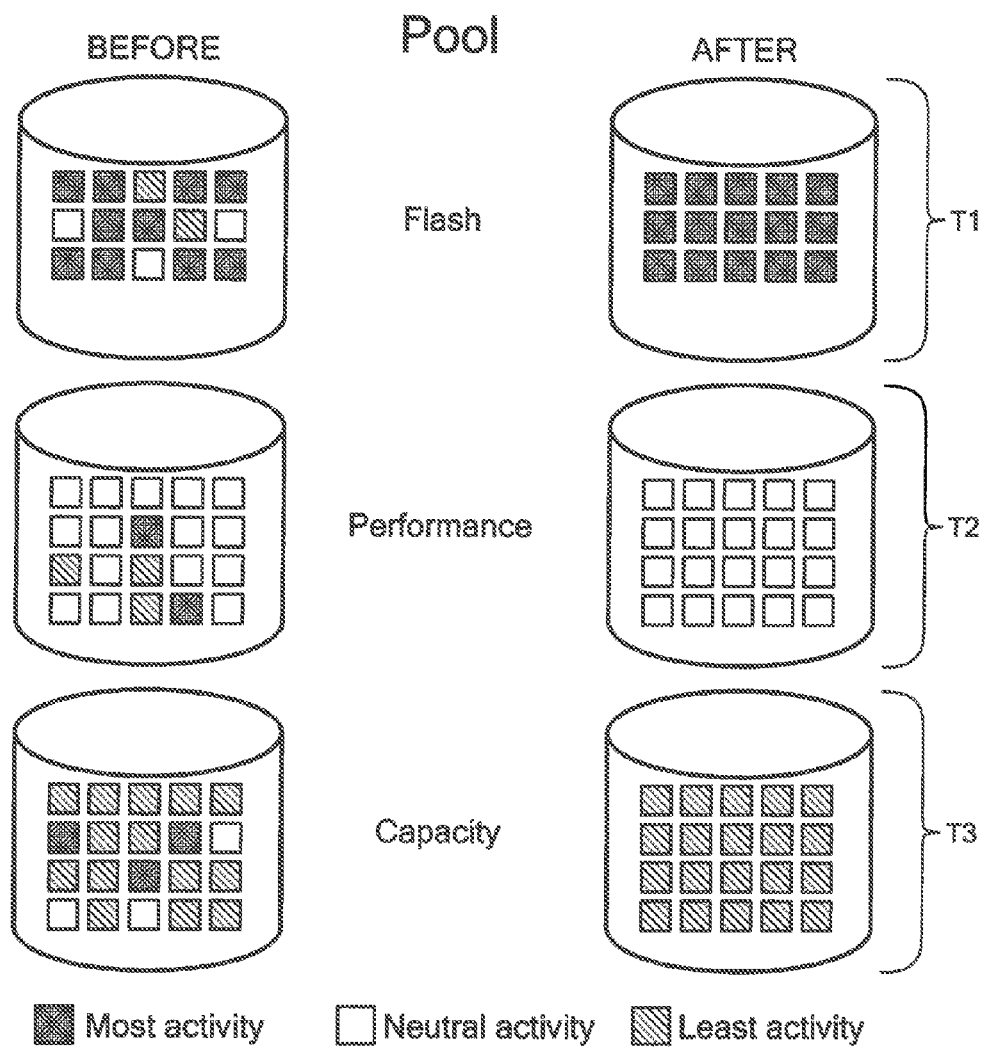
FIG. 15 is a schematic representation of before and after storage tiering.

FAST properties can be viewed and managed at the pool level. FIG. 15 shows the tiering information T1, T2, T3 for a specific pool. The tier status section 1400 of the window shows FAST relocation information specific to the pool selected. Scheduled relocation can be selected at the pool level from the drop-down menu labeled Auto-Tiering 1402. This can be set to either Scheduled or Manual. Users can also connect to the array-wide relocation schedule. Data Relocation Status 1404 displays what state the pool is in with regards to FAST. The ready state indicates that relocation can begin on this pool at any time. The amount of data bound 1406 for a lower tier is shown next to Data to Move Down 1406 and the amount of data bound for a higher tier is listed next to Data to Move Up 1408. Below that is the estimated time 1410 required to migrate all data within the pool to the appropriate tier.

In an exemplary embodiment, there are four tiering policies available within FAST:
Auto-tier
Highest available tier
Lowest available tier
No data movement In one embodiment, auto-tier is the default setting for pool LUNs upon their creation. FAST relocates slices of these LUNs based on their activity level. Slices belonging to LUNs with the auto-tier policy have second priority for capacity in the highest tier in the pool after LUNs set to the highest tier.

The highest available tier setting should be selected for those LUNs which, although not always the most active, require high levels of performance whenever they are accessed. FAST will prioritize slices of a LUN with highest available tier selected above all other settings. Slices of LUNs set to highest tier are rank ordered with each other according to activity. Therefore, in cases where the sum total of LUN capacity set to highest tier is greater than the capacity of the pool's highest tier, the busiest slices occupy that capacity.

The lowest available tier should be selected for LUNs that are not performance or response-time-sensitive. FAST maintains slices of these LUNs on the lowest storage tier available regardless of activity level.

No data movement may only be selected after a LUN has been created. FAST will not move slices from their current positions once the no data movements election has been made. Statistics are still collected on these slices for use if and when the tiering policy is changed.

The tiering policy chosen also affects the initial placement of a LUN's slices within the available tiers. Initial placement with the pool set to auto-tier will result in the data being distributed across all storage tiers available within the pool. The distribution is based on available capacity in the pool. If, for example, 70 percent of a pool's free capacity resides in the lowest tier, then 70 percent of the new slices will be placed in that tier.

LUNs set to highest available tier will have their component slices placed on the highest tier that has capacity available. LUNs set to lowest available tier will have their component slices placed on the lowest tier that has capacity available.

LUNs with the tiering policy set to no data movement will use the initial placement policy of the setting preceding the change to no data movement. For example, a LUN that was previously set to highest tier but is currently set to no data movement will still take its initial allocations from the highest tier possible.

When a pool includes LUNs with stringent response time demands, users may set all LUNs in the pool to highest available tier. That way, new LUN slices are allocated from the highest tier. Since new data is often the most heavily used, this provides the best performance for those slices. At the same time, if all LUNs in the pool are set to highest tier, slices are relocated based on their relative activity to one another.

The highest available tier policy can be used for large scale migrations into a pool. When the migration process is started, it is best to fill the highest tiers of the pool first. Using the auto-tier setting would place some data in the capacity tier. At this point, FAST has not yet run an analysis on the new data so it cannot distinguish between hot and cold data. Therefore, with the auto-tier setting, some of the busiest data may be placed in the capacity tier. In these cases, the target pool LUNs can be set to highest tier. That way, all data is initially allocated to the highest tiers in the pool. As the higher tiers fill and capacity from the capacity (NL-SAS) tier starts to be allocated, the migration can be stopped to run a manual relocation. Assuming an analysis has had sufficient time to run, relocation will rank order the slices and move data appropriately. In addition, since the relocation will attempt to free ten percent of the highest tiers, there is more capacity for new slice allocations in those tiers.

Figure 16:
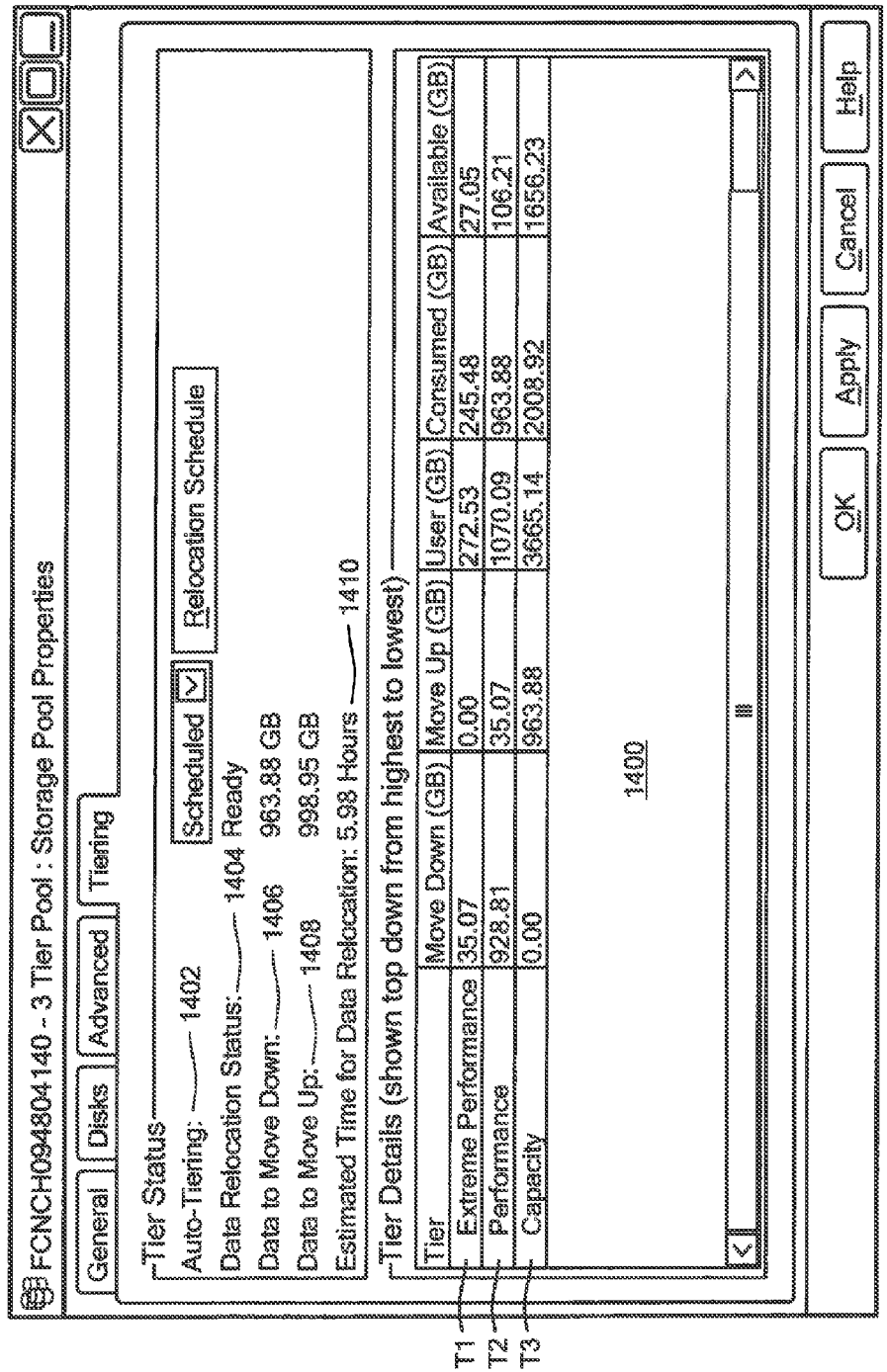
FIG. 16 is display for storage pool properties.
Figure 17:
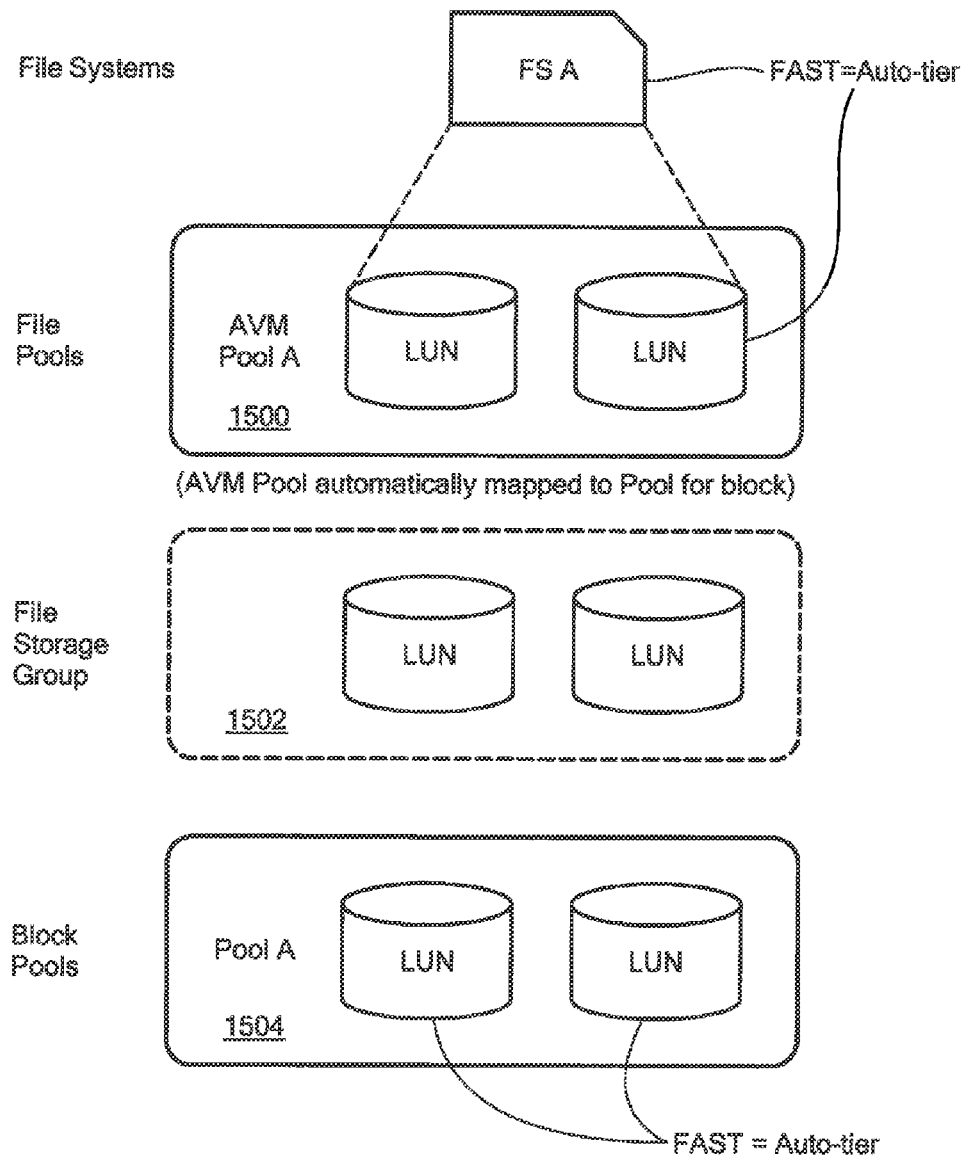
FIG. 17 is a schematic representation of a file storage group.

FIG. 16 shows an exemplary FAST representation for files. An exemplary process begins by provisioning LUNs from a pool 1500 with mixed tiers (or across pools) that are placed in the protected file storage group 1502. Rescanning the storage systems starts a diskmark that makes the LUNs available to file storage. The rescan automatically creates a pool for file using the same name as the corresponding pool for block 1504. Additionally it will create a disk volume in a 1:1 mapping for each LUN that was added to the file storage group. A file system can then be created from the pool for file on the disk volumes. The FAST policy that has been applied to the LUNs presented to file will operate as it does for any other LUN in the system, dynamically migrating data between storage tiers in the pool.

In one aspect of the invention, an array agnostic FAST support mechanism is provided for applying FAST policies to managed service storage in array agnostic manner. The FAST policies cover storage having a variety of types. The storage detail is abstracted for the user to enable the user to select a policy without needing to understand the underlying mechanisms and models of the storage types. The user can rely on managed services to consume storage from FAST associated LUNs, regardless of the underlying array or array mechanisms.

In another aspect of the invention, a cloud storage environment supports auto-tiering in non-tiering supported arrays. As described above, auto tiering provides more control and flexibility to users in placing the portions of LUN on specific tiers, based on their usage pattern. Exemplary tiering policies include:
DEFAULT_HIGHEST_AVAILABLE,
DEFAULT_LOWEST_AVAILABLE,
DEFAULT_AUTO_TIER,
NO_DATAMOVEMENT In a cloud storage environment, it is desirable to have an automated solution starting from selection of a pool to volume creation, and assignment of a Fast policy to the created volume.

Exemplary embodiments of the invention provide a framework for auto tiering implementation in a cloud storage environment. In general, a virtual storage tier is modeled with storage pools carved out of multiple disk types with tiering policies created on the arrays. Mixed storage pools are detected and modeled with each disk type as a virtual tier. This allows a user to select a tiering policy from system defined policies on the array as part of a Virtual Pool (class of Service) In exemplary embodiments, storage pools are auto selected at the time of provisioning using an automated ranking mechanism based on utilization percentages of the virtual storage tiers and the tiering policy provided in the Virtual Pool (CoS). Automated assignment of tiering policies to storage volumes placed in the selected storage pool can be provided. This arrangement provides optimal distribution of volume extents across virtual tiers in the Array.

In auto discovery cycles, the system collects data on storage pools and the list of disk types, from which the pool is carved out. Each disk type is modeled as a virtual tier, which includes data on the underlying disk technology used, percentage of volume data placed in each disk type, which is referred as percentage utilized. In general, a storage pool can include multiple virtual tiers. The class of service is used as an interface to include the virtual tier type and the Fast policy selected by the user.

In an exemplary embodiment, the system runs an automated pool selection process that trims out the pools which do not have enough space to accommodate the volume. From the remaining pools, the system trims out storage pools that do not have the selected drive type as one of their virtual tiers. A ranking mechanism then identifies the match for storage pool.

Figure 18:
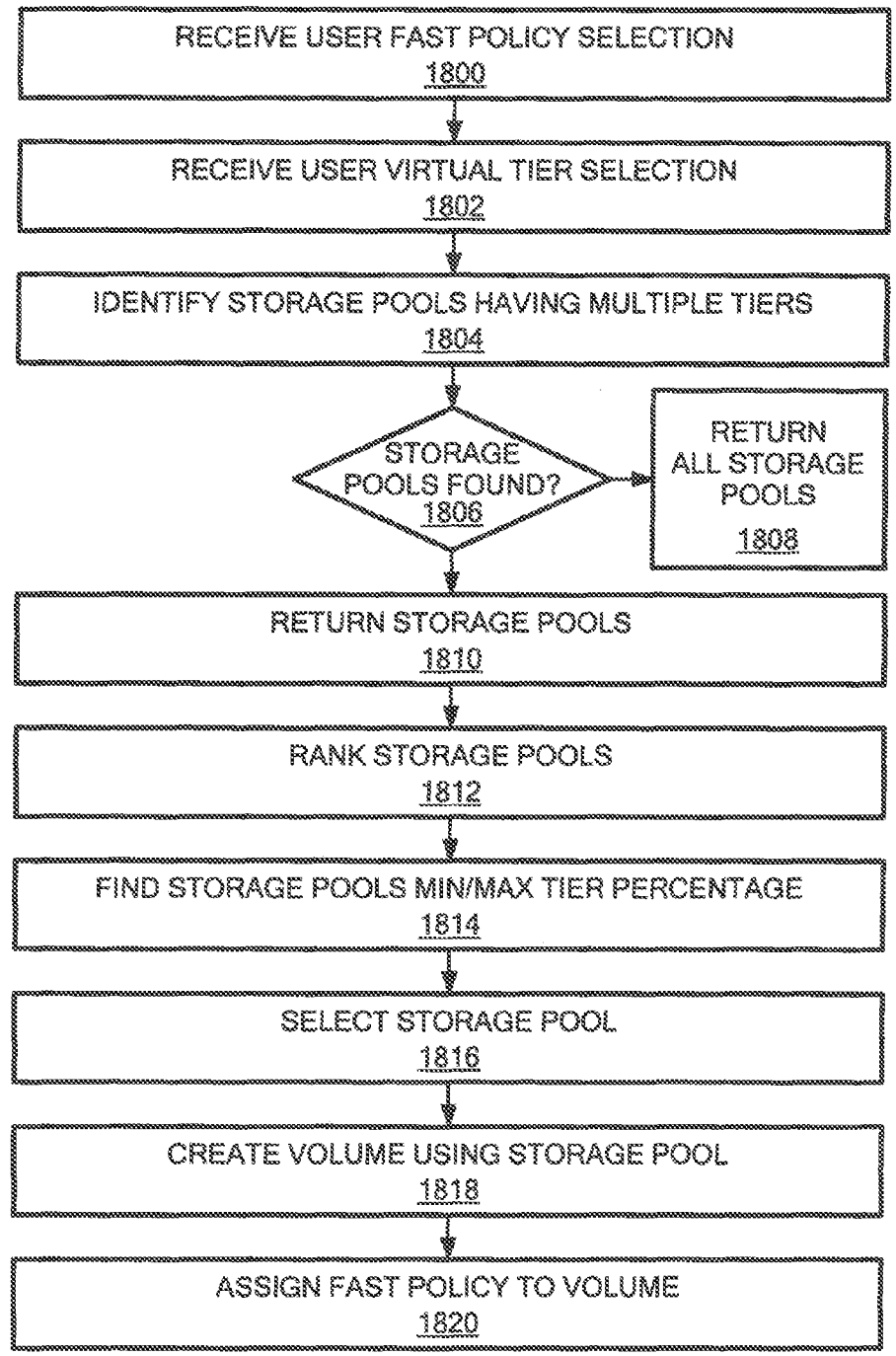
FIG. 18 is a flow diagram showing an exemplary sequence of steps for using FAST policy and virtual tier selection to create a storage volume.
Figure 18A:
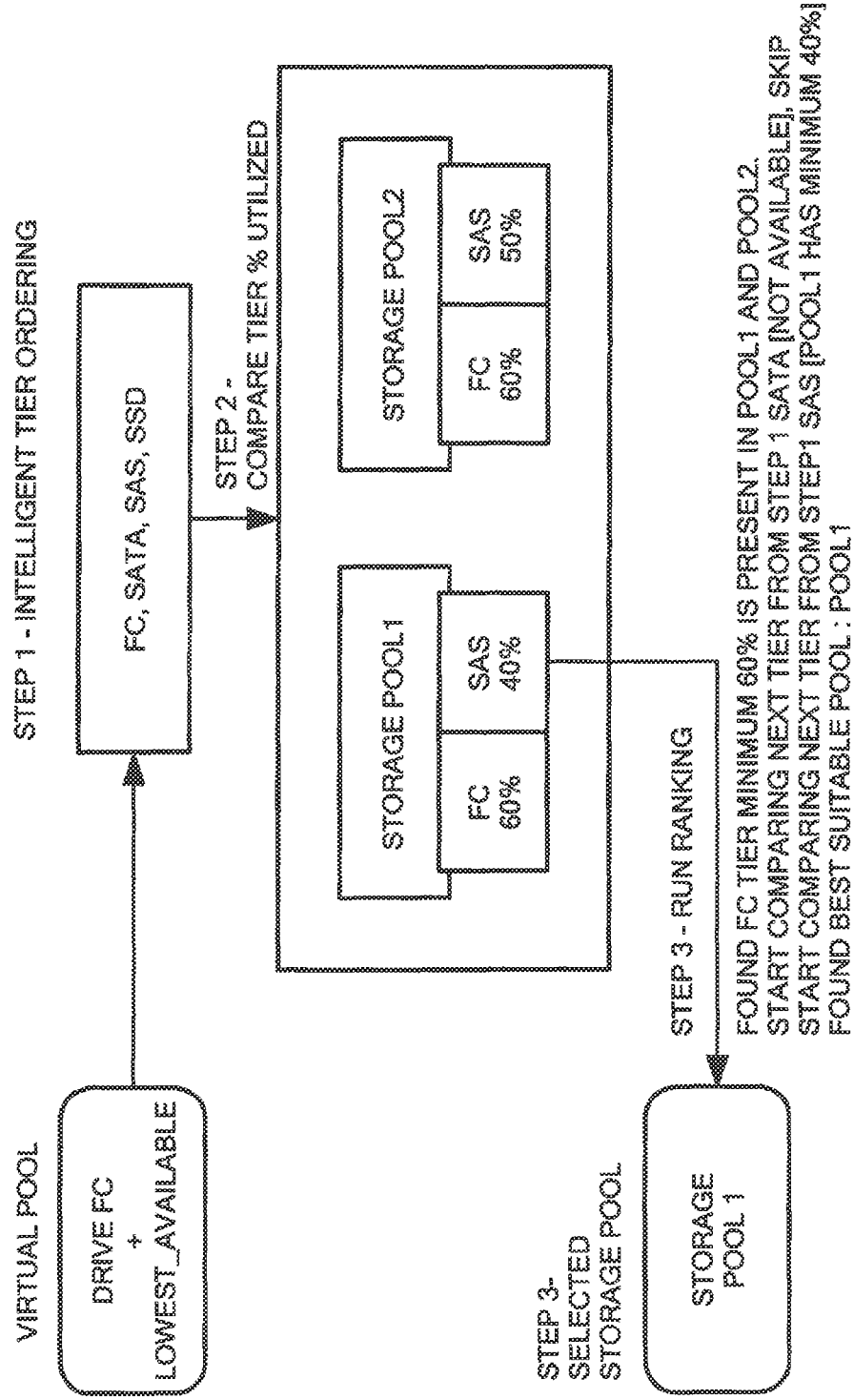
FIGS. 18A-D shows an exemplary ranking implementation.
Figure 18B:
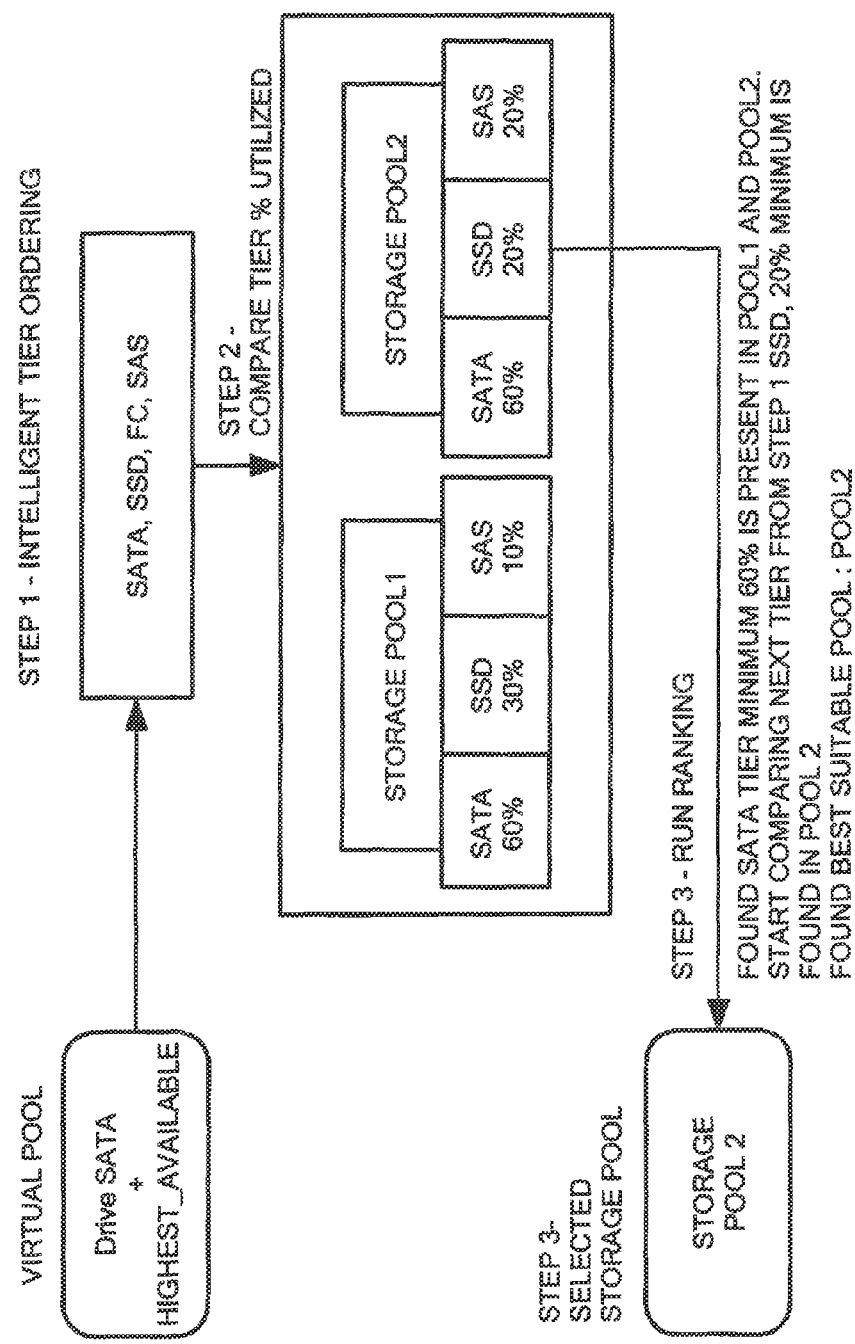
Figure 18C:
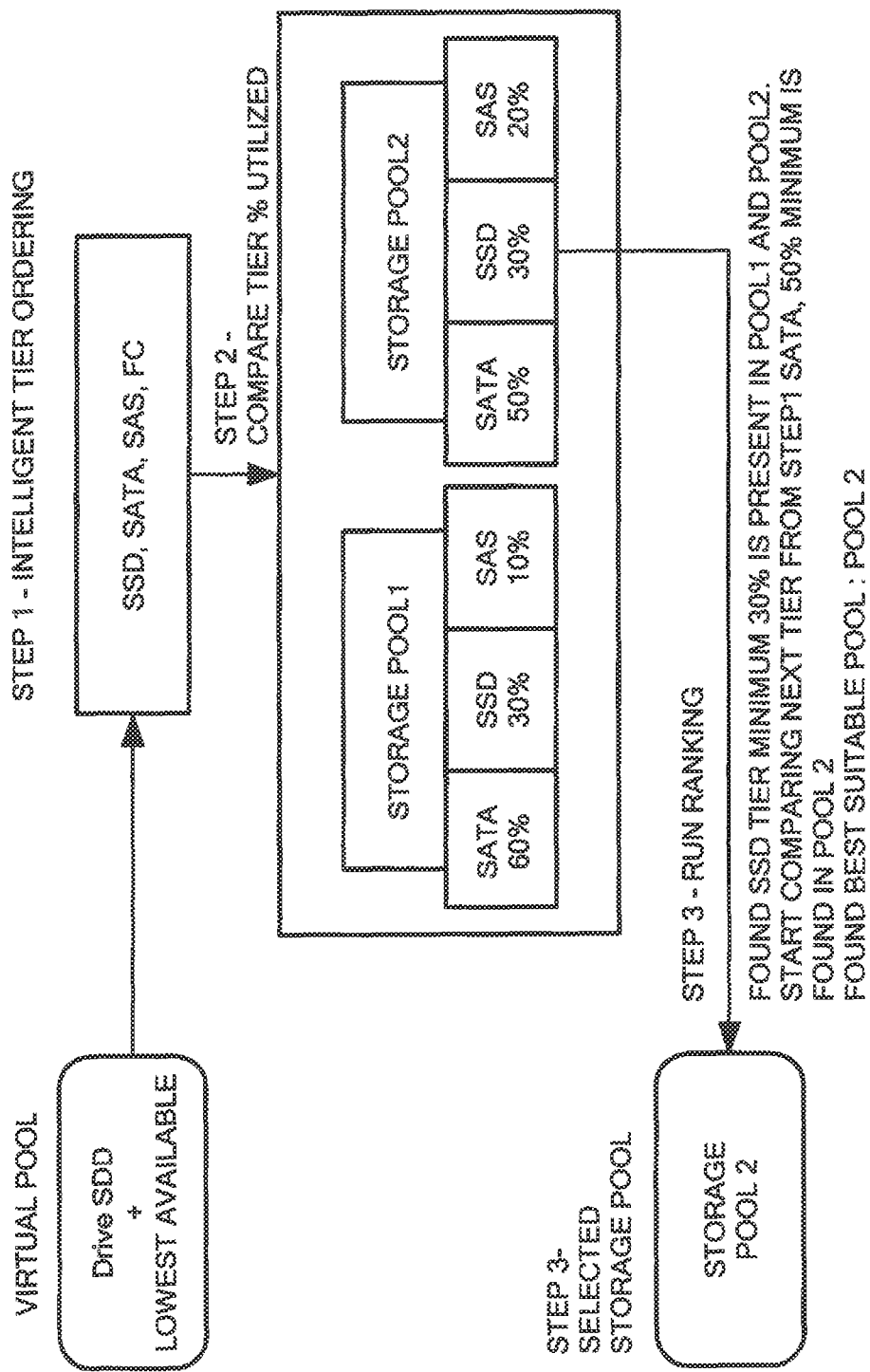
Figure 18D:
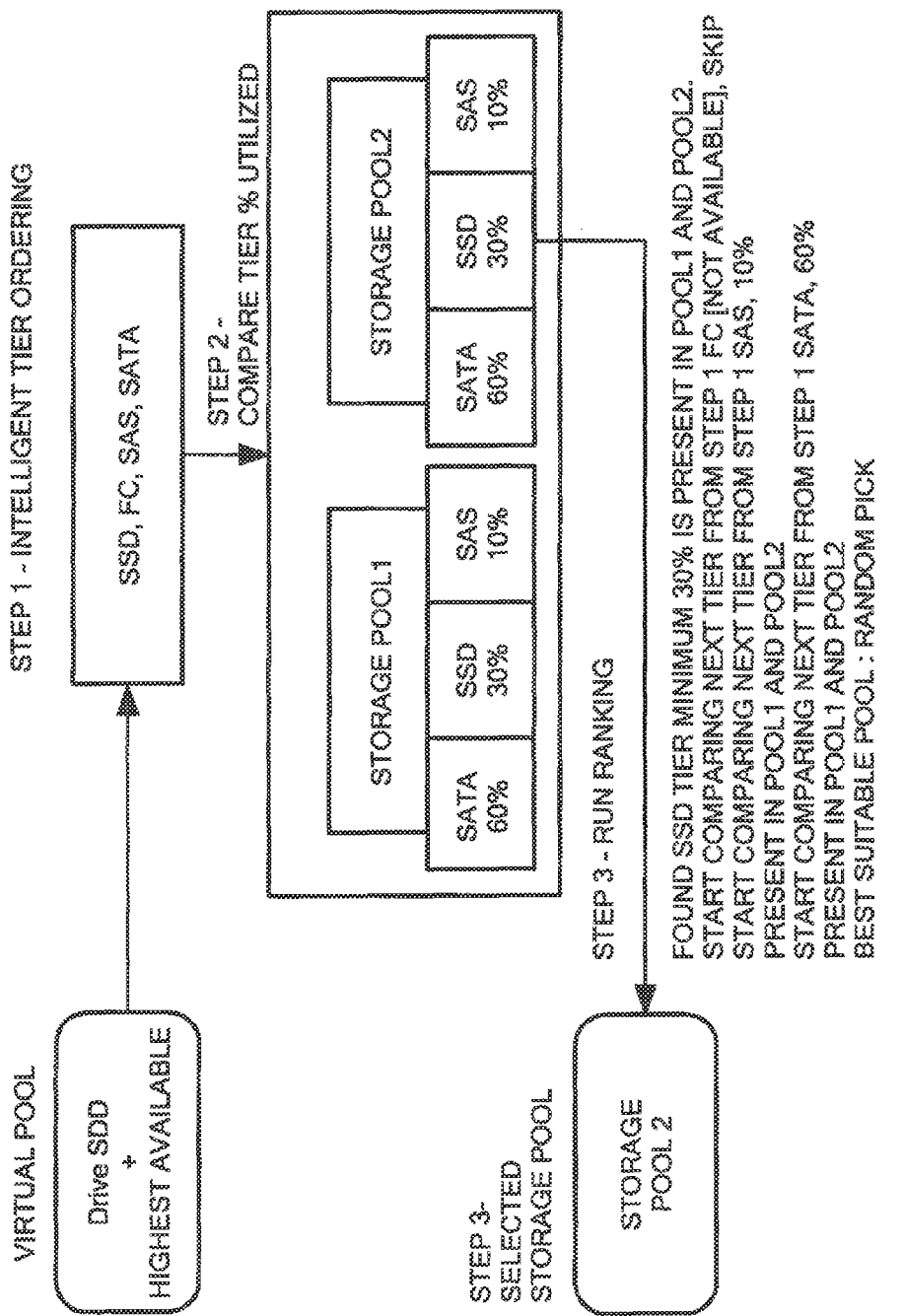

FIG. 18 shows an exemplary sequence of steps for identifying and selecting storage pools and assigning a FAST policy to a volume created from the selected storage pool. In step 1800, a user provides a FAST policy selection and in step 1802 provides a virtual tier selection. In step 1804, the system identifies storage pools having multiple tiers. In step 1806, it is determined whether any storage pools meeting the user selections were found. If not, in step 1808, all storage pools are returned. If so, in step 1812 the returned storage pools are ranked according to the drive type, for example. In step 1814, storage pools with the minimum/maximum tier percentage, as appropriate, are found, as discussed below.

In step 1816, a storage pool identified in step 1814 is selected by the user. In step 1818, a volume is created using the selected storage pool. In step 1820, a FAST policy is assigned to the storage volume.

FIGS. 18A-D show an exemplary ranking mechanism in a scenarios with various drive types and tier types selected. In an exemplary embodiment, ranking operates as follows:

Step 1: Generate the ordering of the tier types, based on initial DriveType selected in VirtualPool (CoS)
    Exemplary Default TierType Ordering for Fast Policies:
        HIGHEST_AVAILABLE—SSD, FC, SAS, SATA
        LOWEST_AVAILABLE—SATA, SAS, FC, SSD
    If FC Tier is selected as initialDriveType with LOWEST_AVAILALE, then ordering is FC, SATA, SAS, SSD
    If FC Tier is selected as initialDriveType with LOWEST_AVAILALE, then ordering is FC, SSD, SAS, SATA
    Step 2: Compare utilization Percentages of passed-in tier type to find the minimum utilized storage pool from the given set of storage pools.
    Step 3: If more than one storage pool containing the given tier type has the same minimum percentage, then start Step 1 with the next tier type.

Figure 19:
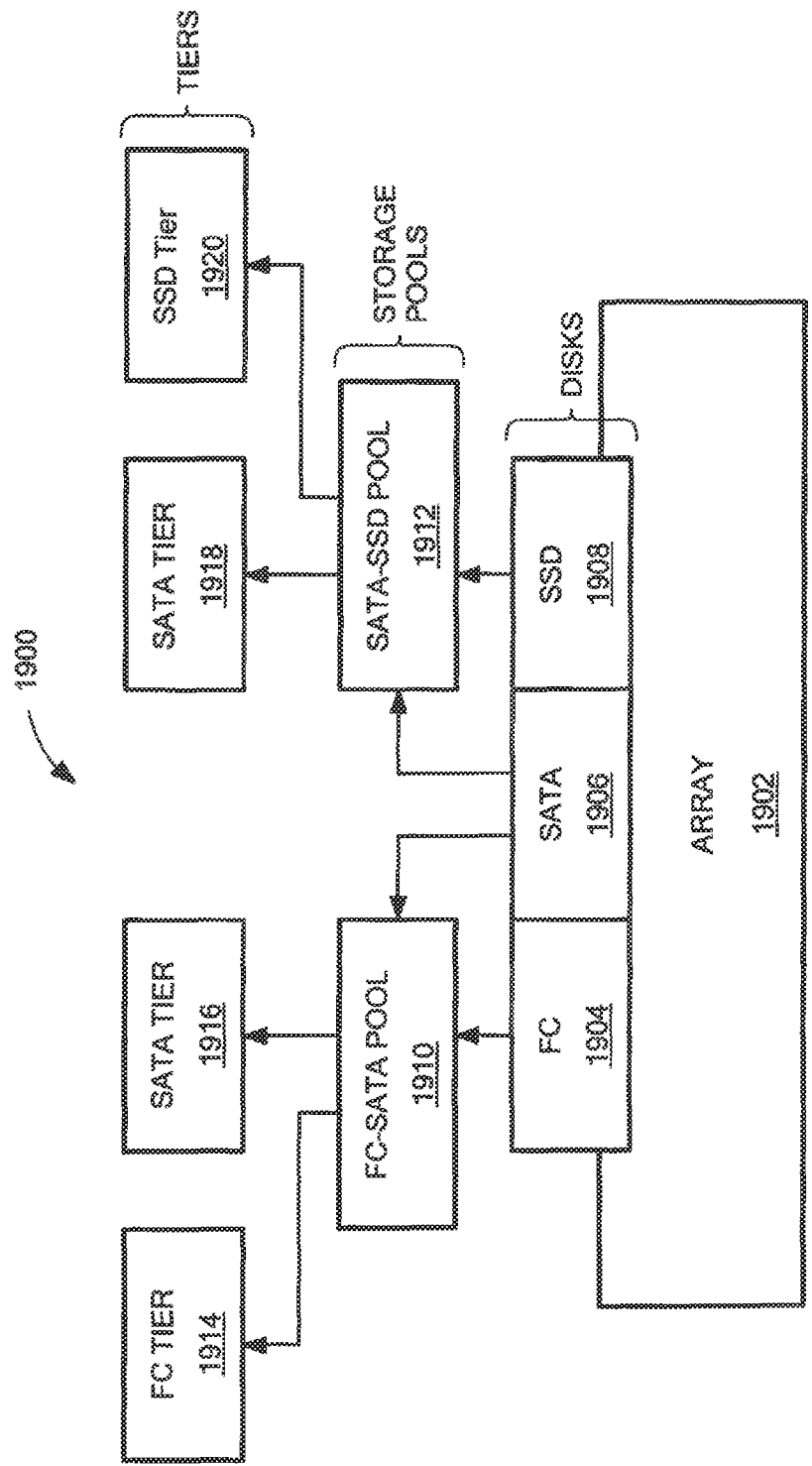
FIG. 19 is an exemplary representation of an array, disk types, storage pools and virtual tiers.

FIG. 19 shows an exemplary virtual tier model 1900. A storage array 1902 includes a number of disk types, shown as Fibre channel 1904, SATA 1906, and SSD 1908. A first storage pool 1910 includes storage from the FC 1904 and SATA 1906 disk types and a second storage pool 1912 includes storage from the SATA 1906 and SSD 1908 disk types. A first virtual tier 1914 for FC storage and a second virtual tier for SATA storage is formed from the first storage pool 1910. A third virtual tier 1918 for SATA storage and a fourth virtual tier 1920 for SSD storage is formed from the second storage pool.

Example 1:—User wants to create a storage volume with FAST policy set to AUTO_TIER, and use "SolidStateDrive" as theVirtual Tier. The system finds the storage pools that contain more than one tier and returns those pools. If none of the pools have more than one tier, all the pools are returned.

Example 2:—User wants to create a storage volume with FAST Policy set to DEFAULT_HIGHEST_AVAILABLE, and use "SolidStateDrive" virtual tier. The drive types, in order of fastest performance, are passed to the ranking mechanism: SSD, FC, NL_SAS, SAS, SATA. The system finds storage pools which contains the minimum tier utilized percentage i.e., pools that contain the minimum SSD percentage. If more than one pool has the same minimum % value, then a second drive type is tried until a single pool is found or all the drive types are executed.

Figure 20:
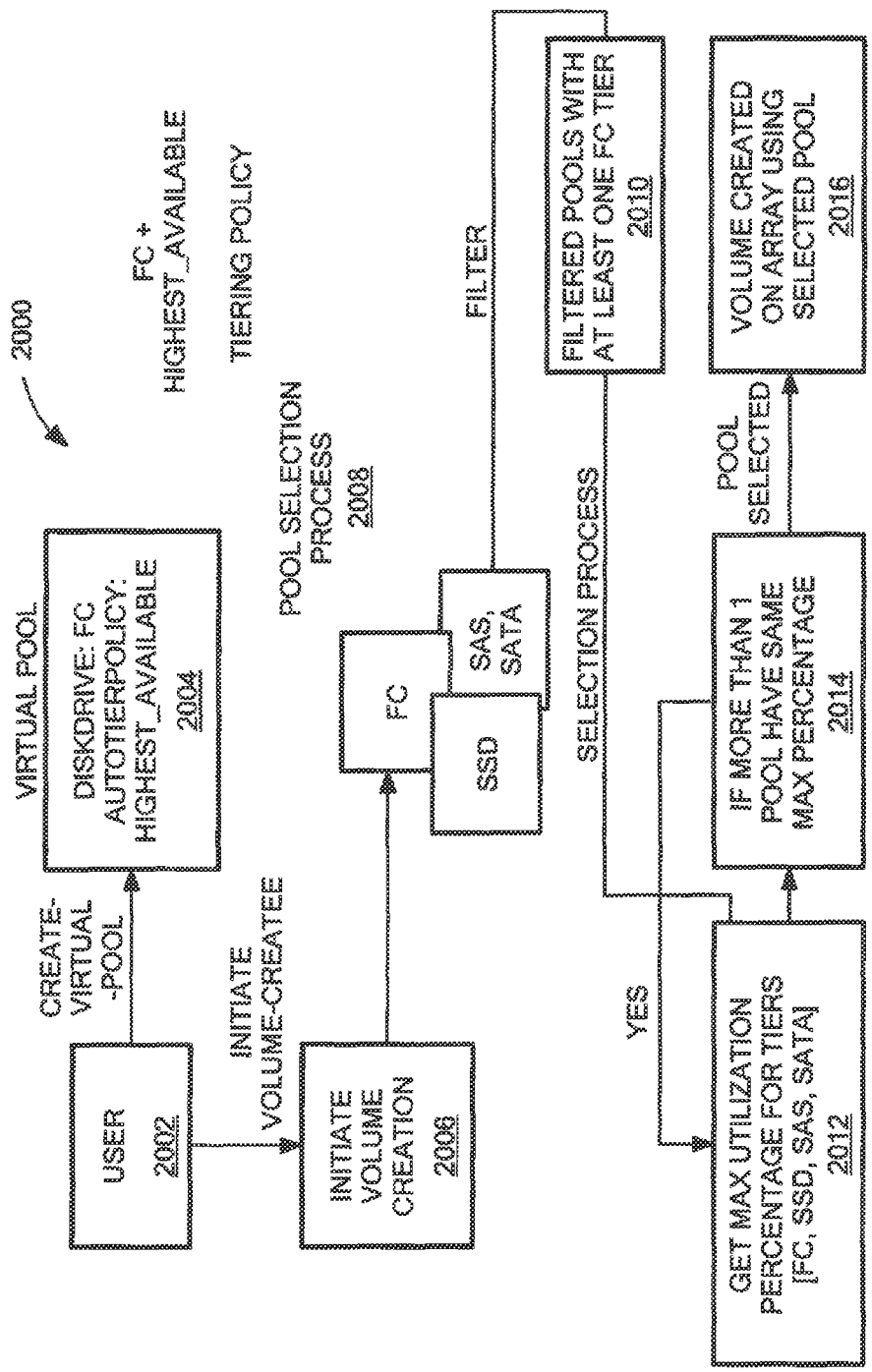
FIG. 20 is a representation of a first example of creating a storage volume based on FAST policy and virtual tier selections by a user.

FIG. 20 shows an exemplary volume creation 2000 for a FAST policy of HIGHEST_AVAILABLE and FC virtual tier. A user 2002 requests to create a virtual pool 2004 with disk type FC and auto tier policy of HIGHEST_AVAILABLE. The user initiates volume creation 2006 from an array 2008 having various disk types, in order, e.g., FC, SSD, SASA, SATA. The system filters 2010 the storage pools against the FC user selection to find pools with at least one FC virtual tier. For identified pools, a minimum utilization percentage for the virtual tiers in the pools is determined 2012. If more than one pool is found to have the same minimum percentage 2014, the process is repeated. A volume is then created on an array using the selected pool 2016.

Example, User wants to create a volume with FAST policy set to LOWEST_AVAILABLE, and use "SSD" virtual tier. Drive types in the specified order (SSD, FC, NL_SAS, SAS, SATA) are passed to the ranking mechanism. The system finds storage pools containing the minimum tier percentage, i.e., pools containing the minimum SSD percentage, in accordance with the LOWEST_AVAILABLE policy. Once the matched storage pool has been selected, the volume is created from the selected pool and assigned the given FAST policy.

Figure 20A:
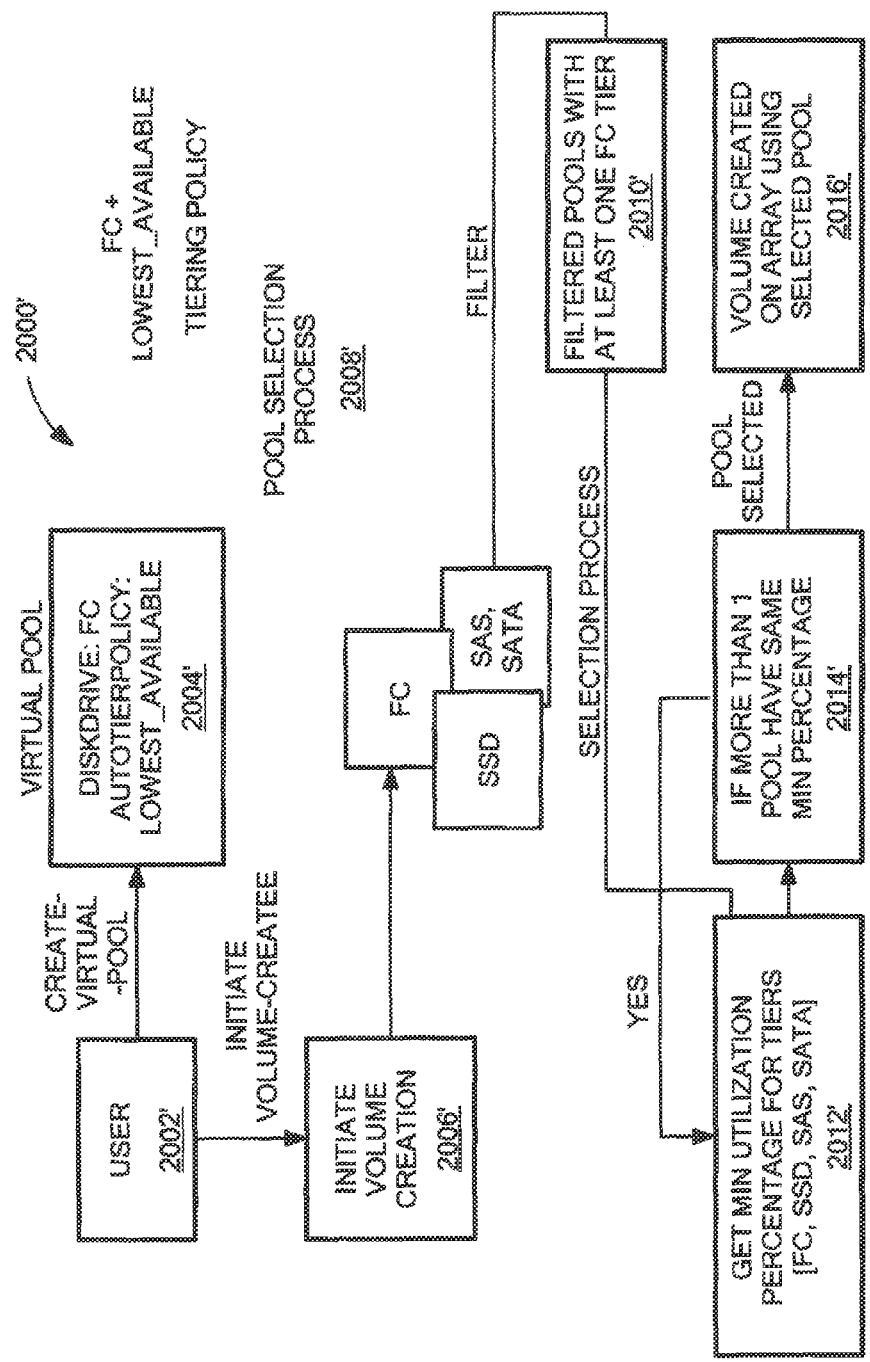
FIG. 20A is a representation of a second example of creating a storage volume based on FAST policy and virtual tier selections by a user.
Figure 20B:
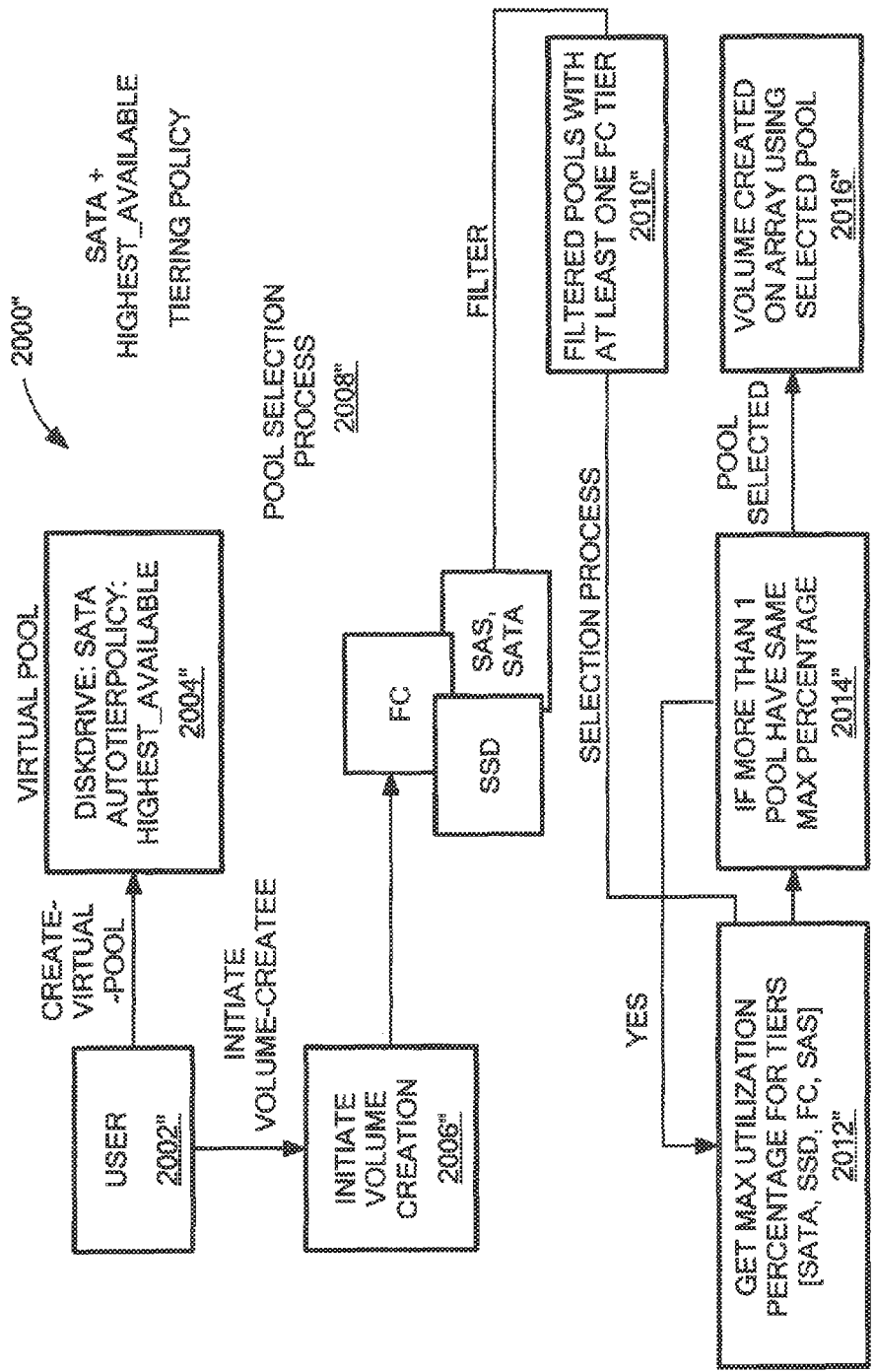
FIG. 20B is a representation of a third example of creating a storage volume based on FAST policy and virtual tier selections by a user.

FIG. 20A shows an example of volume creation with FAST policy set to LOWEST_AVAILABLE, and use "FC" virtual tier. The example of 20A is similar to that of FIG. 20. In 2004', the policy is LOWEST_AVAILABLE instead of HIGHEST_AVAILABLE and in step 2012' the minimum utilization percentage is determined in selecting a storage pool.

Figure 21:
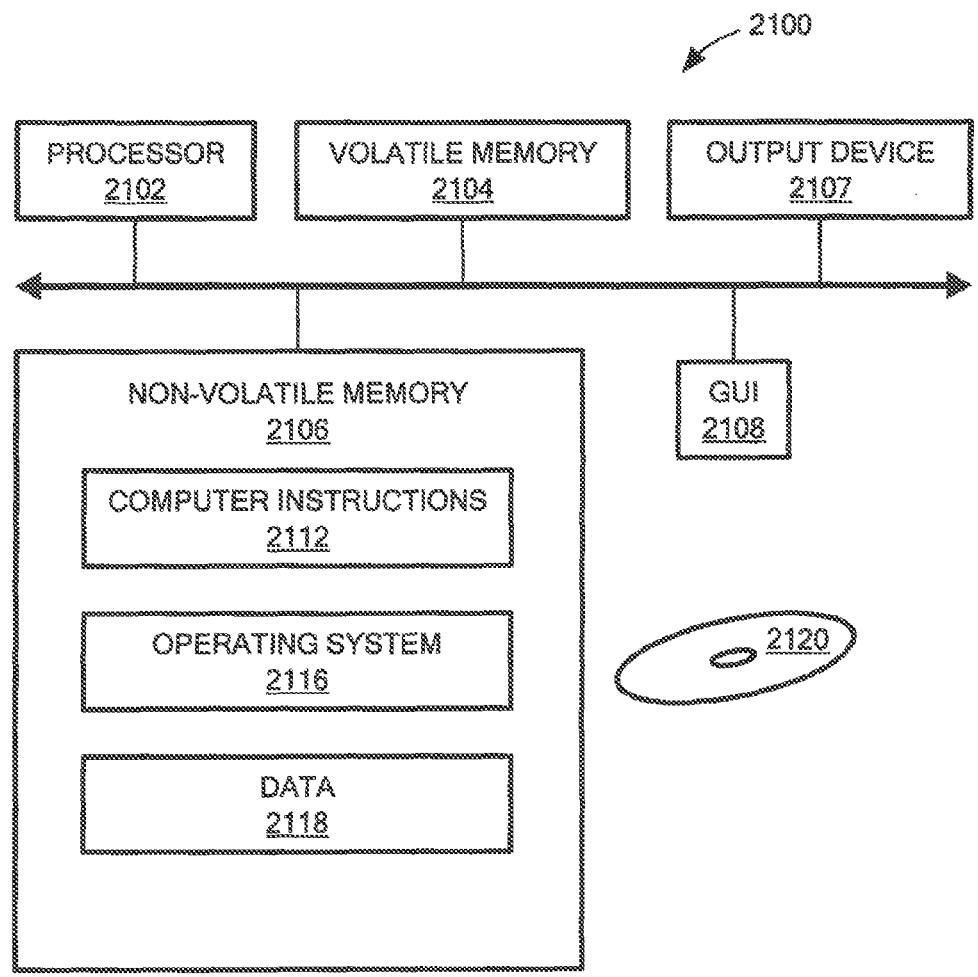
FIG. 21 is a schematic representation of an exemplary computer that can perform at least a portion of the processing described herein.

FIG. 21 shows an exemplary computer 2100 that can perform at least part of the processing described herein. The computer 2100 includes a processor 2102, a volatile memory 2104, a non-volatile memory 2106 (e.g., hard disk), an output device 2107 and a graphical user interface (GUI) 2108 (e.g., a mouse, a keyboard, a display, for example). The non-volatile memory 2106 stores computer instructions 2112, an operating system 2116 and data 2118. In one example, the computer instructions 2112 are executed by the processor 2102 out of volatile memory 2104. In one embodiment, an article 2120 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   receiving a user initiation of volume creation and user selection for an automated storage tier policy from a plurality of automated storage tier policies and selection of a virtual storage tier from a plurality of virtual storage tiers;
   wherein each virtual tier in the plurality of virtual tiers has an associated disk type in the plurality of disk types, wherein an array includes the associated disk types in the plurality of disk types;
   identifying storage pools meeting the user selections from a plurality of storage pools having selected ones of the virtual tiers;
   determining a utilization percentage for the virtual tiers in the identified storage pools;
   selecting one of the identified storage pools based upon the utilization percentages; and
   creating a volume on an array using the selected storage pool.

2. The method according to claim 1, wherein the utilization percentage comprises a maximum utilization.

3. The method according to claim 1, wherein the utilization percentage comprises a minimum utilization.

4. The method according to claim 1, wherein the plurality of virtual storage tiers includes solid state device storage and Fibre channel storage.

5. The method according to claim 1, further including ordering the virtual storage tiers based upon the user selection of virtual tier and storage performance characteristics.

6. The method according to claim 1, wherein the plurality of automated storage tiering policies include highest available and lowest available.

7. The method according to claim 1, further including deriving the virtual tier type corresponds to a class of service selected by the user.

8. The method according to claim 1, further including ordering the virtual tier types, comparing the utilization percentages, and selecting a storage pools from a plurality of storage pools having the same utilization percentage using a next virtual tier type in the ordering.

9. An article, comprising:
  a non-transitory computer-readable medium having stored instructions that enable a machine to
  receive a user initiation of volume creation and user selection for an automated storage tier policy from a plurality of automated storage tier policies and selection of a virtual storage tier from a plurality of virtual storage tiers;
  wherein each virtual tier in the plurality of virtual tiers has an associated disk type in the plurality of disk types, wherein an array includes the associated disk types in the plurality of disk types;
  identify storage pools meeting the user selections from a plurality of storage pools having selected ones of the virtual tiers;
  determine a utilization percentage for the virtual tiers in the identified storage pools;
  select one of the identified storage pools based upon the utilization percentages; and
  create a volume on an array using the selected storage pool.

10. The article according to claim 9, wherein the utilization percentage comprises a maximum utilization.

11. The article according to claim 9, wherein the utilization percentage comprises a minimum utilization.

12. The article according to claim 9, wherein the plurality of virtual storage tiers includes solid state device storage and Fibre channel storage.

13. The article according to claim 9, further including instructions for ordering the virtual storage tiers based upon the user selection of virtual tier and storage performance characteristics.

14. The article according to claim 9, wherein the plurality of automated storage tiering policies include highest available and lowest available.

15. The article according to claim 9, further including instructions for deriving the virtual tier type corresponds to a class of service selected by the user.

16. The article according to claim 9, further including instructions for ordering the virtual tier types, comparing the utilization percentages, and selecting a storage pool from a plurality of storage pools having the same utilization percentage using a next virtual tier type in the ordering.

17. A system, comprising:
  a memory; and
  a processor coupled to the memory, the processor configured to:
  receive a user initiation of volume creation and user selection for an automated storage tier policy from a plurality of automated storage tier policies and selection of a virtual storage tier from a plurality of virtual storage tiers;
  wherein each virtual tier in the plurality of virtual tiers has an associated disk type in the plurality of disk types, wherein an array includes the associated disk types in the plurality of disk types;
  identify storage pools meeting the user selections from a plurality of storage pools having selected ones of the virtual tiers;
  determine a utilization percentage for the virtual tiers in the identified storage pools;
  select one of the identified storage pools based upon the utilization percentages; and
  create a volume on an array using the selected storage pool.

* * * * *